US011016585B2

(12) United States Patent
Park et al.

(10) Patent No.: US 11,016,585 B2
(45) Date of Patent: *May 25, 2021

(54) ELECTRONIC PEN INCLUDING WATERPROOF STRUCTURE AND ELECTRONIC DEVICE INCLUDING THE SAME

(71) Applicant: Samsung Electronics Co., Ltd., Suwon-si (KR)

(72) Inventors: Daehyeong Park, Seongnam-si (KR); Jong-Min Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,822

(22) Filed: Jan. 27, 2020

(65) Prior Publication Data
US 2020/0159345 A1 May 21, 2020

Related U.S. Application Data

(63) Continuation of application No. 15/460,031, filed on Mar. 15, 2017, now Pat. No. 10,545,585.

(30) Foreign Application Priority Data

Mar. 31, 2016 (KR) ........................ 10-2016-0039739

(51) Int. Cl.
G06F 3/0354 (2013.01)
G06F 3/039 (2013.01)
(Continued)

(52) U.S. Cl.
CPC ........ *G06F 3/03545* (2013.01); *G06F 3/0383* (2013.01); *G06F 3/0393* (2019.05); *G06F 3/046* (2013.01)

(58) Field of Classification Search
CPC .... G06F 3/03545; G06F 3/0383; G06F 3/039; G06F 3/046; G06F 3/044
See application file for complete search history.

(56) References Cited

U.S. PATENT DOCUMENTS 7,884,811 B2 2/2011 Paratore et al.
2007/0268278 A1 11/2007 Paratore et al.
(Continued)

FOREIGN PATENT DOCUMENTS

EP 2986087 A1 2/2016
KR 10-2007-0063858 A 6/2007
(Continued)

OTHER PUBLICATIONS

Extended European Search Report for European Application No. 17161019.9, dated Jul. 20, 2017, 9 pages.

Primary Examiner — Christopher J Kohlman

(57) ABSTRACT

According to various exemplary embodiments, an electronic pen and an electronic device for detecting the same are provided. The electronic pen includes: a pen housing; a substrate assembly mounted inside the pen housing, and comprises a coil and a substrate which configured to generate a resonant frequency by an induced current generated in the coil; and at least one packing member disposed on at least a part of the substrate of the substrate assembly, and includes at least a part thereof overlap an inner surface of the pen housing when the substrate assembly is mounted in the pen housing.

20 Claims, 32 Drawing Sheets

(51) Int. Cl.
*G06F 3/038* (2013.01)
*G06F 3/046* (2006.01)

(56) References Cited

U.S. PATENT DOCUMENTS

| | | |
|---|---|---|
| 2009/0025094 A1 | 1/2009 | York et al. |
| 2011/0000720 A1 | 1/2011 | Mao et al. |
| 2011/0290913 A1 | 12/2011 | Jung |
| 2013/0199311 A1* | 8/2013 | Horie .................... G06F 3/0383 |
| | | 73/862.626 |
| 2014/0354604 A1 | 12/2014 | Huang |
| 2018/0364823 A1 | 12/2018 | Kamiyama et al. |

FOREIGN PATENT DOCUMENTS

| | | |
|---|---|---|
| KR | 10-2009-0029196 A | 3/2009 |
| KR | 10-2016-0016260 A | 2/2016 |

* cited by examiner

ELECTRONIC PEN INCLUDING WATERPROOF STRUCTURE AND ELECTRONIC DEVICE INCLUDING THE SAME

CROSS-REFERENCE TO RELATED APPLICATIONS

This application is a continuation of application Ser. No. 15/460,031, filed Mar. 15, 2017, which priority to Korean Application No. 10-2016-0039739, filed Mar. 31, 2016, the entire contents of which are hereby incorporated by reference.

BACKGROUND

1. Field

Various exemplary embodiments of the present disclosure relate to an electronic pen having a waterproof structure and an electronic device including the same.

2. Description of Related Art

An electronic device may include a touch display which is used as a data inputting and outputting means. In general, the electronic device may input data by touching the touch display using a user's finger The electronic device may include an input device of a pen type (for example, an electronic pen or a touch pen) as an auxiliary data inputting means, and may include a complex touch display for selectively inputting data by means of such an input device. According to an exemplary embodiment, the electronic device may use a touch input by a finger and a pen input by a pen type input device exclusively or in combination.

In recent year, electronic devices are additionally provided with a waterproof/dustproof function in consideration of portability and life convenience, and a pen type input device which is included in an electronic device or carried therewith is required to have the waterproof/dustproof function.

SUMMARY

To address the above-discussed deficiencies, it is a primary object to provide at least the advantages described below. Accordingly, the present disclosure provides an electronic pen that provides a waterproof/dustproof function.

Another aspect of the present disclosure provides an electronic device that is configured to perform a corresponding function in the water using an electronic pen having a waterproof/dustproof structure.

According to an aspect of the present disclosure, there are provided an electronic pen and an electronic device for detecting the same, the electronic pen including: a pen housing; a substrate assembly that is mounted inside the pen housing, and includes a coil and a substrate that generates a resonant frequency by an induced current generated in the coil; and at least one packing member that is disposed on at least a part of the substrate of the substrate assembly, and has at least a part thereof overlap an inner surface of the pen housing when the substrate assembly is mounted in the pen housing.

According to another aspect of the present disclosure, there are provided an electronic pend and an electronic device applying the same, the electronic pen including: a pen housing; a substrate assembly mounted in the pen housing and configured to generate a resonant frequency by electromagnetic induction; a pen head installed on one end of the housing; a key button installed in a button receiving hole formed on an appropriate location of an outer surface of the pen housing; and a packing member disposed on at least a part of the substrate assembly.

The substrate assembly may include: a substrate that includes a switch configured to operate by an operation of the key button; a pen pressure sensor that is connected to one side of the substrate; a coil holder that includes a coil connected to the pen pressure sensor; a pen tip disposed in such a way that the pen tip is configured to penetrate through the coil holder, and has at least a part thereof exposed to the outside of the pen housing; and a head bracket that is connected to the other side of the substrate to be connected with the pen head.

When the substrate assembly is assembled with the pen housing, at least a part of the packing member may overlap an inner surface of the pen housing.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
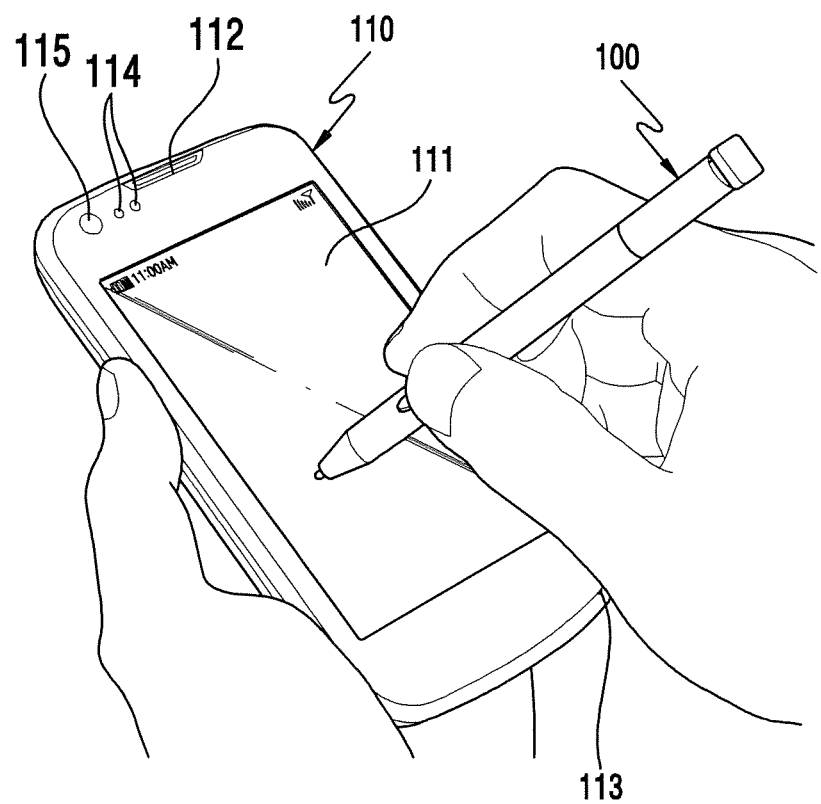
FIG. 1A illustrates a view showing a use state in which an electronic device is used using an electronic pen having a waterproof structure according to various exemplary embodiments of the present disclosure.

FIGS. 1A through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

Exemplary embodiments of the present disclosure will be described herein below with reference to the accompanying drawings. However, various exemplary embodiments of the present disclosure are not limited to the specific embodiments and should be construed as including modifications, equivalents and/or alternative of exemplary embodiments of the present disclosure. In the explanation of the drawings, similar reference numerals are used for similar elements.

The terms "have," "may have," "include," and "may include" used in exemplary embodiments of the present disclosure indicate the presence of corresponding features (for example, elements such as numerical values, functions, operations, or parts), and do not preclude the presence of additional features.

The terms "A or B," "at least one of A or/and B," or "one or more of A or/and B" used in exemplary embodiments of the present disclosure include all possible combinations of items enumerated with them. For example, "A or B," "at least one of A and B," or "at least one of A or B" means (1) including at least one A, (2) including at least one B, or (3) including both at least one A and at least one B.

The term such as "first" and "second" used in various exemplary embodiments may modify various elements regardless of an order and/or importance of the corresponding elements, and does not limit the corresponding elements. These terms may be used for the purpose of distinguishing one element from another element. For example, a first user device and a second user device may indicate different user devices regardless of the order or importance. For example, a first element may be named a second element without departing from the scope of the right described in various exemplary embodiments of the present disclosure, and similarly, a second element may be named a first element.

It will be understood that when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that when an element (for example, a first element) is "directly coupled with/to" or "directly connected to" another element (for example, a second element), there is no intervening element (for example, a third element) between the element and another element.

The expression "configured to (or set to)" used in various exemplary embodiments of the present disclosure may be replaced with terms "suitable for," "having the capacity to," "designed to," "adapted to," "made to," or "capable of" according to a context. The term "configured to (set to)" does not necessarily mean "specifically designed to" in a hardware level. Instead, the expression "device configured to . . . " may mean that the device is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor) capable of performing a corresponding operation by executing one or more software programs stored in a memory device.

The terms used in various exemplary embodiments of the present disclosure are just for the purpose of describing particular exemplary embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various exemplary embodiments. According to circumstances, even the terms defined in the exemplary embodiments should not be interpreted as excluding the embodiments of the present disclosure.

An electronic device according to various exemplary embodiments of the present disclosure may include at least one of a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), an MP3 player, a mobile medical machine, a camera, or a wearable device. According to various exemplary embodiments, the wearable device may include at least one of an accessory type device (for example, a watch, a ring, a bracelet, an ankle bracelet, a necklace, eyewear, contact lenses, or a head-mounted-device (HMD)), a fabric or clothing integral type device (for example, electronic clothing), a body attachment type device (for example, a skin pad or tattoos), or a bioimplant type device (for example, an implantable circuit).

According to exemplary embodiments, the electronic device may be a home appliance. For example, the home appliance may include at least one of a television, a digital video disk (DVD) player, a stereo, a refrigerator, an air conditioner, a cleaner, an oven, a microwave oven, a washing machine, an air cleaner, a set-top box, a home automation control panel, a security control panel, a TV box (for example, SAMSUNG HOMESYNC™, APPLE TV™, or GOOGLE TV™), a game console (for example, XBOX™, PLAYSTATION™), an electronic dictionary, an electronic key, a camcorder, or an electronic album.

According to another exemplary embodiment, the electronic device may include at least one of various medical machines (for example, various portable medical measurement devices (a glucose monitor, a heart rate monitor, a blood pressure measuring device, or a thermometer), magnetic resonance angiography (MRA), magnetic resonance imaging (MRI), computerized tomography (CT), a tomograph, an ultrasound machine, and the like), a navigation device, a global positioning system (GPS) receiver, an event data recorder (EDR), a flight data recorder (FDR), an automotive infotainment device, electronic equipment for ship (for example, a navigation equipment for ship, a gyro compass, and the like), avionics, a security device, a head unit for vehicles, an industrial or home robot, an automatic teller machine (ATM) of a financial institution, point of sales (POS) of a store, or Internet of Things (for example, a lamp, various sensors, an electric or gas meter, a sprinkler, a fire alarm, a thermostat, a streetlamp, a toaster, an exercising machine, a hot water tank, a heater, a boiler, or the like).

According to an exemplary embodiment, the electronic device may include at least one of a part of furniture or a building/a structure, an electronic board, an electronic signature receiving device, a projector, and various measurement devices (for example, devices for measuring water, power, gas, radio waves, and the like). The electronic device according to various exemplary embodiments of the present disclosure may be one or a combination of one or more of the above-mentioned devices. In addition, the electronic device according to various exemplary embodiments of the present disclosure may be a flexible device. In addition, the electronic device according to various exemplary embodiments of the present disclosure is not limited to the above-mentioned devices, and may include a new electronic device accompanied by technology development.

Hereinafter, an electronic device according to various exemplary embodiments will be explained with reference to the accompanying drawings. The term "user" used in the various exemplary embodiments may refer to a person who uses the electronic device or a device that uses the electronic device (for example, an artificial intelligence electronic device).

Figure 1B:
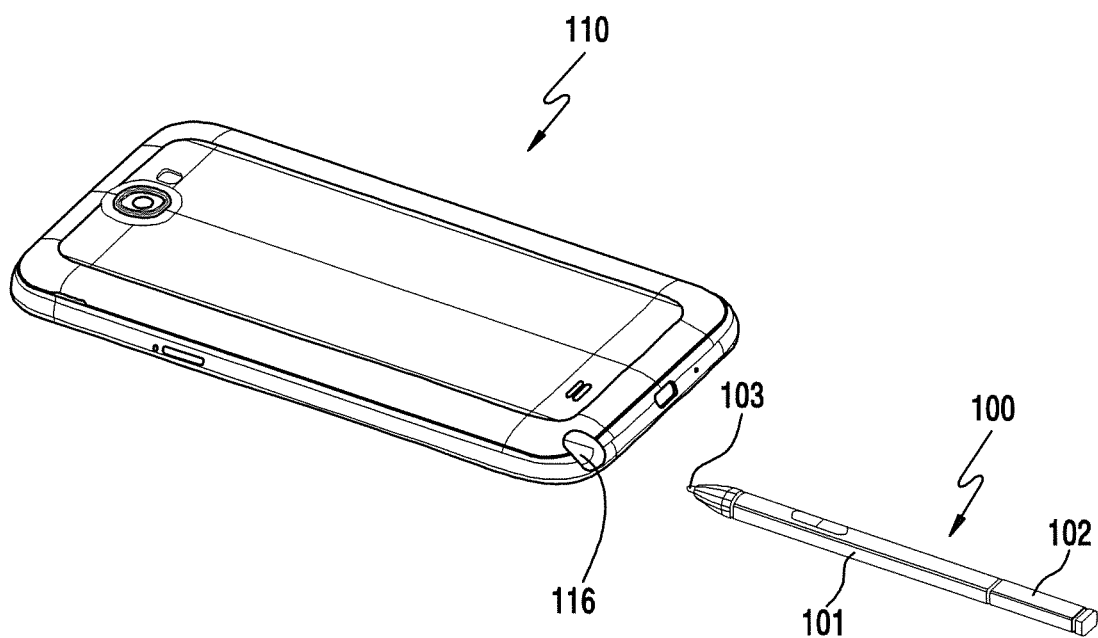
FIG. 1B illustrates a perspective view of an electronic device that includes an electronic pen having a waterproof structure according to various exemplary embodiments of the present disclosure.

FIG. 1A illustrates a view showing a use state in which an electronic device is used using an electronic pen having a waterproof structure according to various exemplary embodiments of the present disclosure. FIG. 1B illustrates a perspective view of the electronic device including the electronic pen having the waterproof structure according to various exemplary embodiments of the present disclosure.

Referring to FIGS. 1A and 1B, the electronic device 110 may perform a function using the electronic pen 100. According to an exemplary embodiment, the electronic device 100 may have a display 111 disposed on the front surface thereof. According to an exemplary embodiment, a speaker device 112 may be disposed on one side of the display 111 to output the other person's voice. According to an exemplary embodiment, a microphone device 113 may be disposed on the other side of the display 111 to transmit a user's voice to the other person.

According to various exemplary embodiments, on the periphery of the speaker device 112, components may be arranged to perform various function of the electronic device 110. The components may include at least one sensor module 114. The sensor module 114 may include at least one of an illuminance sensor (for example, a light sensor), a proximity sensor (for example, a light sensor), an infrared sensor, and an ultrasonic sensor, for example. According to an exemplary embodiment, the electronic device 110 may detect whether the electronic device 110 is in the water or not by calculating a reflection coefficient of a reflected sound wave using the ultrasonic sensor. However, this should not be considered as limiting. The electronic device 110 may detect whether the electronic device 110 is in the water or not using a capacitive touch sensor included in the display 111. According to an exemplary embodiment, the components may include a front camera device 115. According to an exemplary embodiment, the components may include an indicator for letting a user recognize state information of the electronic device 110.

According to various exemplary embodiments, the electronic pen 100 may be attachably and detachably installed through a pen receiving hole 116 disposed on a part of the electronic device 110 (for example, a lower side). According to an exemplary embodiment, the electronic pen 100 may include a pen housing 101, a pen tip 103 disposed at one side of the pen housing 101, for inputting data to the display of the electronic device in a contact or contactless (hovering) method, and a pen head 102 disposed at the other side of the pen housing 101, for defining the length of the electronic pen 100 and locking or disconnecting the electronic pen 100 mounted into the electronic device 110.

According to various exemplary embodiments, the electronic device 110 may have a waterproof/dustproof structure that can be used in the water using the electronic pen 100 having a waterproof/dustproof structure implemented according to exemplary embodiments of the present disclosure. According to an exemplary embodiment, the pen receiving hole 116 also applies the waterproof/dustproof structure, such that the electronic device 110 can be used in the water regardless of whether the electronic pen 100 is inserted or not.

According to various exemplary embodiments, the electronic device 110 may include a pen sensor having a plurality of coils arranged therein to intersect with one another (normally, referred to as a digitizer), separately from a touch panel. In addition, the electronic pen 100 may include a resonance circuit. Accordingly, the electronic pen 100 may operate to apply an alternating current (AC) signal to a coil array of the pen sensor and cause a magnetic field to be generated, and, when the electronic pen 100 comes into contact with the display 111 of the electronic device 100 or approaches within a predetermined distance, a coil body disposed in the electronic pen may oscillate with the magnetic field and generate an induced current, and as a result, a resonant frequency is generated in the electronic pen 100. The electronic device can determine a touch location of the electronic pen 100 by detecting the generated resonant frequency.

According to various exemplary embodiments, since the electronic pen 100 is mounted in a portable electronic device or is carried independently, and is commonly used in daily life, the electronic pen 100 is likely to be submerged and have a foreign substance flow into the electronic pen 100, causing malfunction. According to an exemplary embodiment, since the electronic pen also has the waterproof/dustproof structure so as to interwork with the electronic device having the waterproof structure in the embodiments of the present disclosure, durability can be enhanced and a corresponding function of the electronic device may be induced to be performed in the water.

Hereinafter, an electronic pen having a waterproof or dustproof structure will be described in detail.

Figure 2:
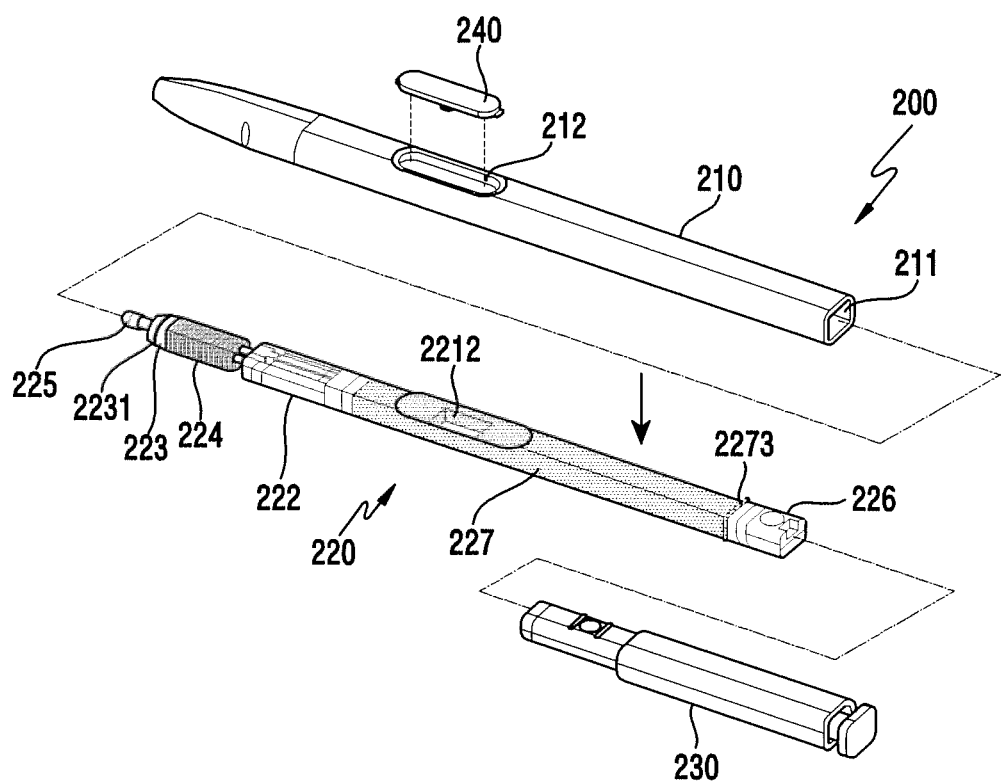
FIG. 2 illustrates an exploded perspective view of an electronic pen according to various exemplary embodiments of the present disclosure.

FIG. 2 illustrates an exploded perspective view of an electronic pen according to various exemplary embodiments of the present disclosure.

The electronic pen 200 of FIG. 2 may be similar to the electronic pen 100 of FIG. 1 or may be another embodiment of the electronic pen.

Referring to FIG. 2, the electronic pen 200 may include a hollow type pen housing 210, a substrate assembly 220 that is mounted in an assembly receiving hole 211 corresponding to the hollow of the pen housing 210, a pen head 230 that finishes at an end of the pen housing 210 in which the substrate assembly 220 is mounted, and a key button 240 that is mounted in a button receiving hole 212 formed on an appropriate location of the pen housing 210.

According to various exemplary embodiments, the substrate assembly 220 may include a substrate (not shown), and a pen pressure sensor 222, a coil holder 223, and a pen tip 225 that are arranged on one side of the substrate in sequence. The coil holder 223 may include a coil 224 wound therearound multiple times, and the pen tip 225 may be installed to reach the pen pressure sensor 222 in such a way that the pen tip 225 penetrates through the coil holder 223. According to an exemplary embodiment, the substrate assembly 220 may further include a head bracket 226 connected with the pen head 230 on the other side of the substrate.

According to various exemplary embodiments, the electronic pen 200 may form a magnetic flux by an AC to be supplied to the coil array disposed in the pen sensor (for example, a digitizer) disposed in the electronic device, and may generate an induced current in the coil when the electronic pen approaches, such that a current accumulates in a capacitor disposed in the substrate and a pre-set resonant frequency is generated by an LC circuit. According to an exemplary embodiment, the electronic device may detect the resonant frequency generated in the electronic pen and perform a corresponding function. According to an exemplary embodiment, when the substrate assembly 220 is mounted in the pen housing 210, the pen tip 225 may protrude from an end of the pen housing 210 and may move in the pen pressure sensor 222 according to a pressing operation of the pen tip 225 pressing a touch surface of the electronic device. According to an exemplary embodiment, the electronic pen 200 may change the resonant frequency by changing a capacitance value according to the movement of the pen tip 225, and the electronic device may detect the change in the resonant frequency and perform a corresponding function. According to an exemplary embodiment, the key button 240 may change the capacitance value of the substrate by switching a switch 2212 (for example, a dome switch) disposed on the substrate, and the electronic device performs a corresponding function.

According to various exemplary embodiments, the electronic pen 200 may include a waterproof/dustproof structure. According to an exemplary embodiment, a packing member 227 may be disposed in such a way that the packing member 227 packs only a substrate area of the substrate assembly 220. According to an exemplary embodiment, the packing member 227 may pack from at least a part of the head bracket 226 to a part where the substrate ends in the direction of the coil. According to an exemplary embodiment, the packing member 227 may include at least one of rubber, urethane, silicon, or a plastic resin. According to an exemplary embodiment, the packing member 227 may be formed by applying the entirety of the substrate assembly 220 to a mold or applying only the substrate area to a mold, molding by injecting a liquid or semi-solid packing material, and then solidifying by cooling (including naturally cooling).

According to various exemplary embodiments, a packing ring 2231 may be applied to the coil holder 223 of the substrate assembly 220. According to an exemplary embodiment, the packing ring 2231 may be independently installed on the coil holder 223 or may be integrally formed with the coil holder 223 when the coil holder 223 is formed of rubber, silicon, or urethane. According to an exemplary embodiment, the packing member 227 may include a packing protrusion 2273 disposed adjacent to the head bracket 226. According to an exemplary embodiment, the packing protrusion 2273 may be independently formed or integrally formed with the packing member 227.

According to various exemplary embodiments, when the substrate assembly 220 is assembled with the pen housing 210, the packing member 227, the packing ring 2231, and the packing protrusion 2273 overlap the inner surface of the pen housing 210, such that a sealing space is formed in the electronic pen 200, and the substrate assembly 220 can implement the waterproof/dustproof function in the sealing space. According to an exemplary embodiment, the switch 2212 may be disposed in such a way that the switch 2213 is recessed from the packing member 227, and the area of the packing member 227 on the periphery of the switch 2212 overlaps the pen housing 210, such that a sealing function is performed. According to an exemplary embodiment, the switch 2212 may apply a waterproof dome switch.

Figure 3A:
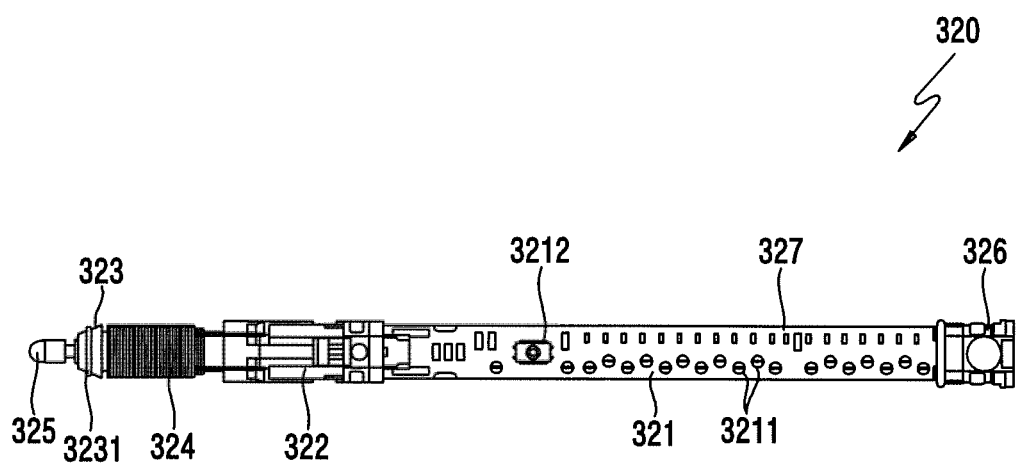
FIG. 3A illustrates a view showing a configuration of a substrate assembly of an electronic pen according to various exemplary embodiments of the present disclosure.
Figure 3B:
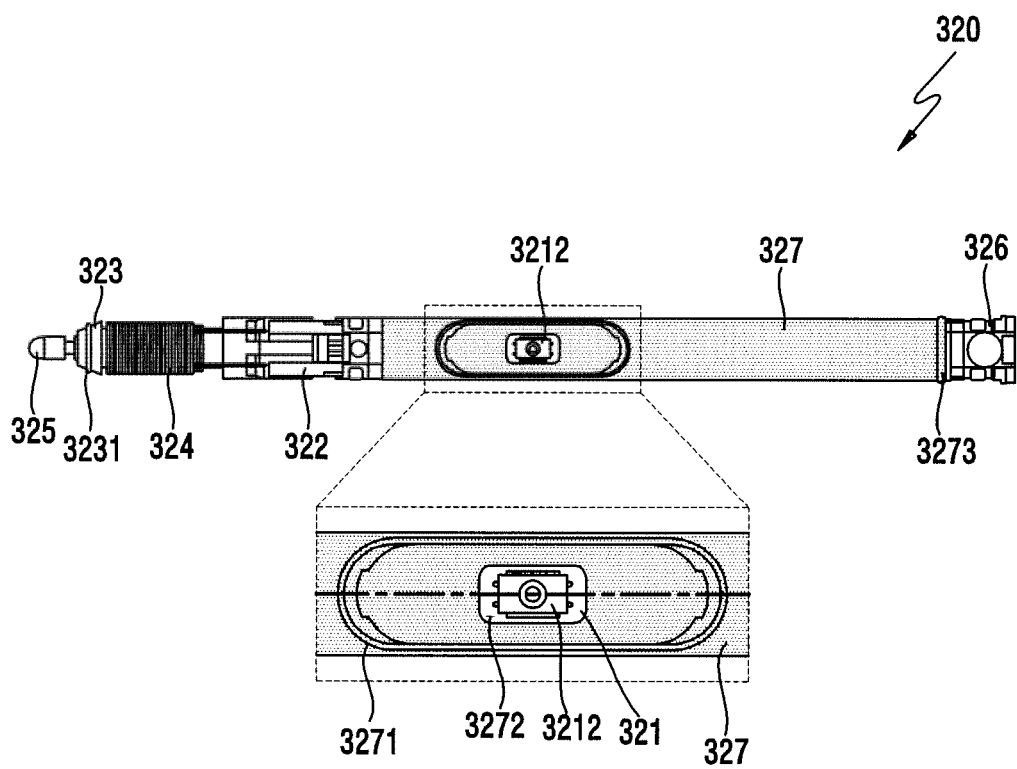
FIG. 3B illustrates a view showing a state in which a packing member is applied to the substrate assembly according to various exemplary embodiments of the present disclosure.
Figure 3C:
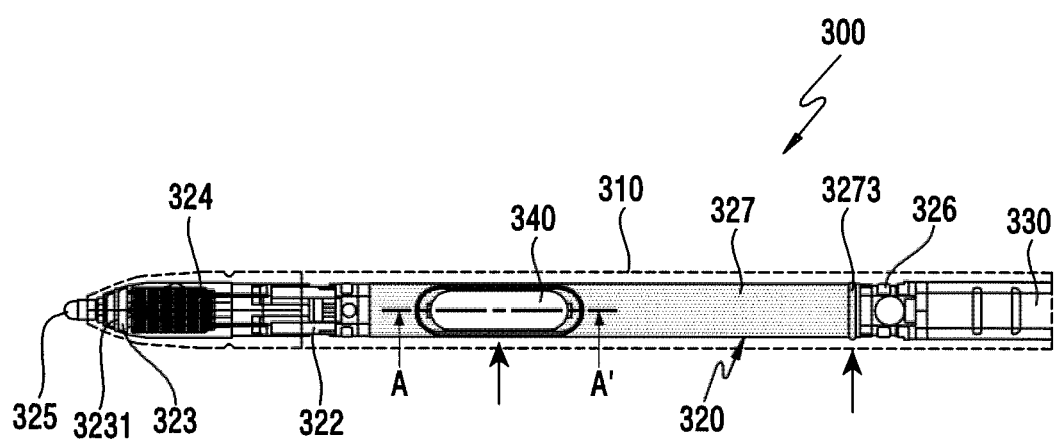
FIG. 3C illustrates a view showing a state in which the substrate assembly to which the packing member is applied is mounted in a pen housing according to various exemplary embodiments of the present disclosure.
Figure 3D:
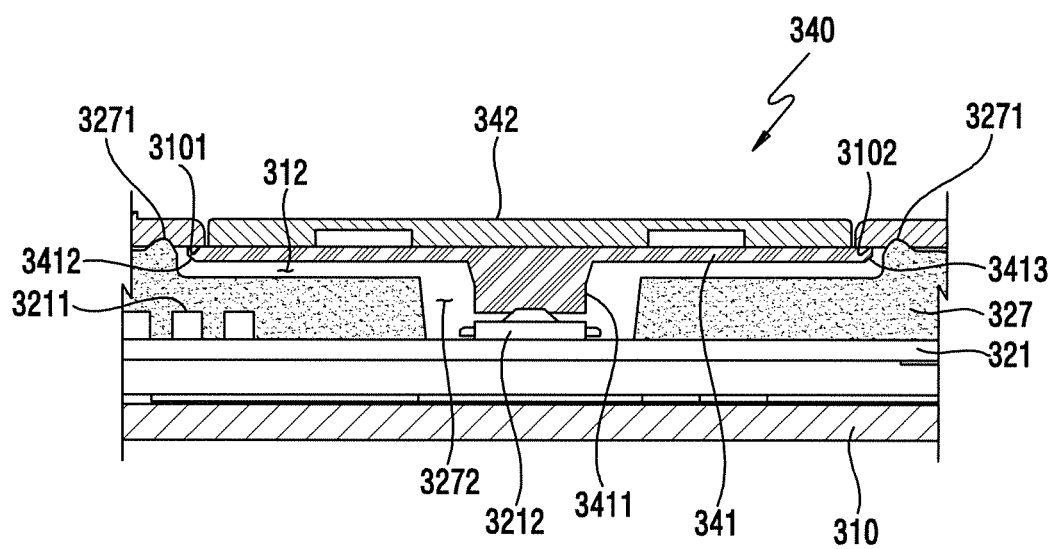
FIG. 3D illustrates a main part cross section view as viewed from line A-A' of FIG. 3C according to various exemplary embodiments of the present disclosure.

FIG. 3A illustrates a view showing a configuration of a substrate assembly of an electronic pen according to various exemplary embodiments of the present disclosure. FIG. 3B illustrates a view showing a state in which a packing member is applied to the substrate assembly according to various exemplary embodiments of the present disclosure. FIG. 3C illustrates a view showing a state in which the substrate assembly to which the packing member is applied is mounted in a pen housing according to various exemplary embodiments of the present disclosure. FIG. 3D illustrates a main part cross section view as viewed from line A-A' of FIG. 3C according to various exemplary embodiments of the present disclosure.

The substrate assembly 320 and the other components of FIGS. 3A to 3D may be similar to the substrate assembly 220 and the other components of FIG. 2 or may be another embodiment of the substrate assembly and the other components.

Referring to FIG. 3A, according to various exemplary embodiments, the substrate assembly 320 may include a substrate 321 on which a plurality of electronic components (electronic function group) 3211 are mounted, and a pen pressure sensor 322, a coil holder 323, and a pen tip 325 that are arranged on one side of the substrate 321 in sequence. The coil holder 323 may include a coil 324 wound therearound multiple times, and the pen tip 325 may be installed to reach the pen pressure sensor 322 in such a way that the pen tip 325 penetrates through the coil holder 323. According to an exemplary embodiment, the substrate assembly 320 may include a head bracket 326 connected with a pen head of the electronic pen on the other side of the substrate 321.

According to various exemplary embodiments, a packing ring 3231 may be applied to the coil holder 323 of the substrate assembly 320. According to an exemplary embodiment, the packing ring 3231 may be formed of rubber, urethane, or silicon. According to an exemplary embodiment, the packing ring 3231 may be independently installed on the coil holder 323 or may be integrally formed with the coil holder 323 when the coil holder 323 is formed of rubber, silicon, or urethane.

Referring to FIG. 3B, a packing member 327 may be applied to the substrate. According to an exemplary embodiment, the packing member 327 may be disposed in such a way that the packing member 327 packs only the area of the substrate 321 of the substrate assembly 320. According to an exemplary embodiment, the packing member 327 may pack from at least a part of the head bracket 326 to a part where the substrate 321 ends in the direction of the coil. According to an exemplary embodiment, the packing member 327 may include at least one of rubber, urethane, silicon, or a plastic resin. According to an exemplary embodiment, the packing member 327 may be formed by applying the entirety of the substrate assembly 320 to a mold or applying only the substrate area to a mold, molding by injecting a liquid or semi-solid packing material, and then solidifying by cooling (including naturally cooling)

According to various exemplary embodiments, the packing member 327 may include a first packing protrusion 3273 disposed adjacent to the head bracket 326. According to an exemplary embodiment, the first packing protrusion 3273 may be integrally formed with the packing member 327 or independently formed.

Referring to FIG. 3C, when the substrate assembly 320 is assembled with the pen housing 310, the packing member 327, the packing ring 3231, and the first packing protrusion 3273 overlap the inner surface of the pen housing 310, such that a sealing space is formed in the electronic pen 300 and the substrate assembly 320 can implement the waterproof/dustproof function by such a sealing space. In this case, moisture can be prevented by the packing ring 3231 from flowing through the pen tip 325 of the electronic pen 300, and moisture can be prevented by the first packing protrusion 3273 from flowing through the pen head 330 of the electronic pen 300.

Referring to FIGS. 3A and 3D, the switch 3212 may be disposed on the substrate 321 in such a way that the switch 3213 is recessed from the packing member 327. According to an exemplary embodiment, the packing member 327 may include a second packing protrusion 3271 that is formed higher than the surface of the packing member 327 in such a manner that the second packing protrusion 3271 encloses a substrate exposure space 3272 on the periphery of the switch 3212. According to an exemplary embodiment, when the substrate assembly 320 is mounted in the pen housing 310, the second packing protrusion 3271 may tightly overlap the inner surface of the pen housing 310, such that moisture flowing by the operation of the key button 340 flows into the substrate exposure space 3272 of the button receiving hole 312, but is sealed by the second packing protrusion 3271 and can be prevented from permeating in the pen housing in the direction of the pen pressure sensor 322 or in the direction of the pen head 330. According to an exemplary embodiment, the switch 3212 may apply a waterproof dome switch.

Accordingly, when the substrate assembly 320 and the pen head 330 are completely assembled with the pen housing 310 of the electronic pen 300, moisture is prevented by the packing ring 3231 from flowing through the pen tip 325, moisture is prevented by the first packing protrusion 3273 from flowing through the pen head 330, and moisture is prevented by the second packing protrusion 3271 from flowing through the connection portion of the key button 340.

According to various exemplary embodiments, the key button 340 may include a key base 341 and a key top 342 connected with the top surface of the key base 341. The key base 341 and the key top 342 may be connected with each other by bonding, ultrasonic fusing, or a double-sided tape. According to an exemplary embodiment, the key base 341 may include a pressing protrusion 3411 protruding therefrom to press the switch 3212 disposed thereunder when the key button 340 is operated. According to an exemplary embodiment, the key base 341 may be formed of a relatively rigid material and may have a pair of locking pieces 3412, 3413 formed at opposite ends. Accordingly, when the key button 340 is mounted in the pen housing 310, the first locking piece 3412 of the key base 341 is locked with a first locking projection 3101 of the pen housing 310, and the second locking piece 3413 of the key base 341 may be locked with a second locking projection 3102 of the pen housing 310.

Figure 6A:
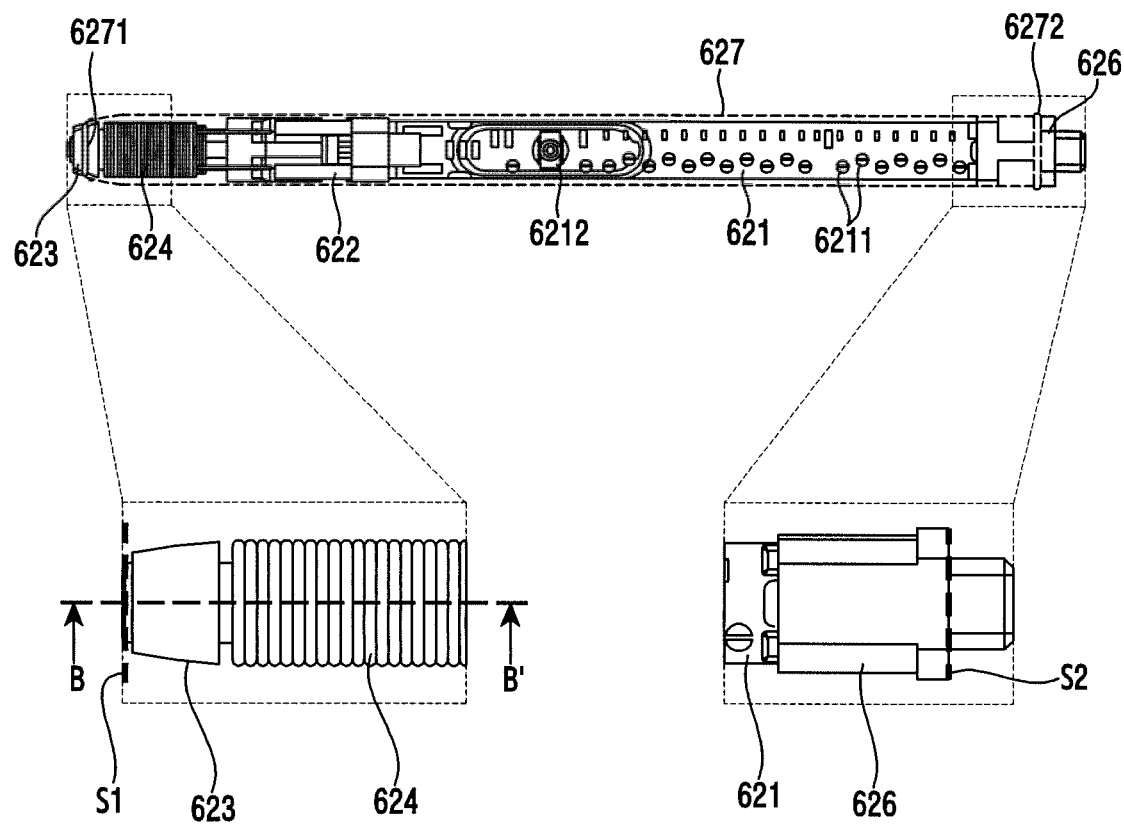
FIG. 6A illustrates a view showing a configuration of a substrate assembly according to various exemplary embodiments of the present disclosure.

According to various exemplary embodiments, the switch 3212 may implement waterproofing/dustproofing in such a way that the switch 3212 is not recessed from the packing member 327 and is packed with the packing member 327 as shown in FIG. 6A.

Figure 4:
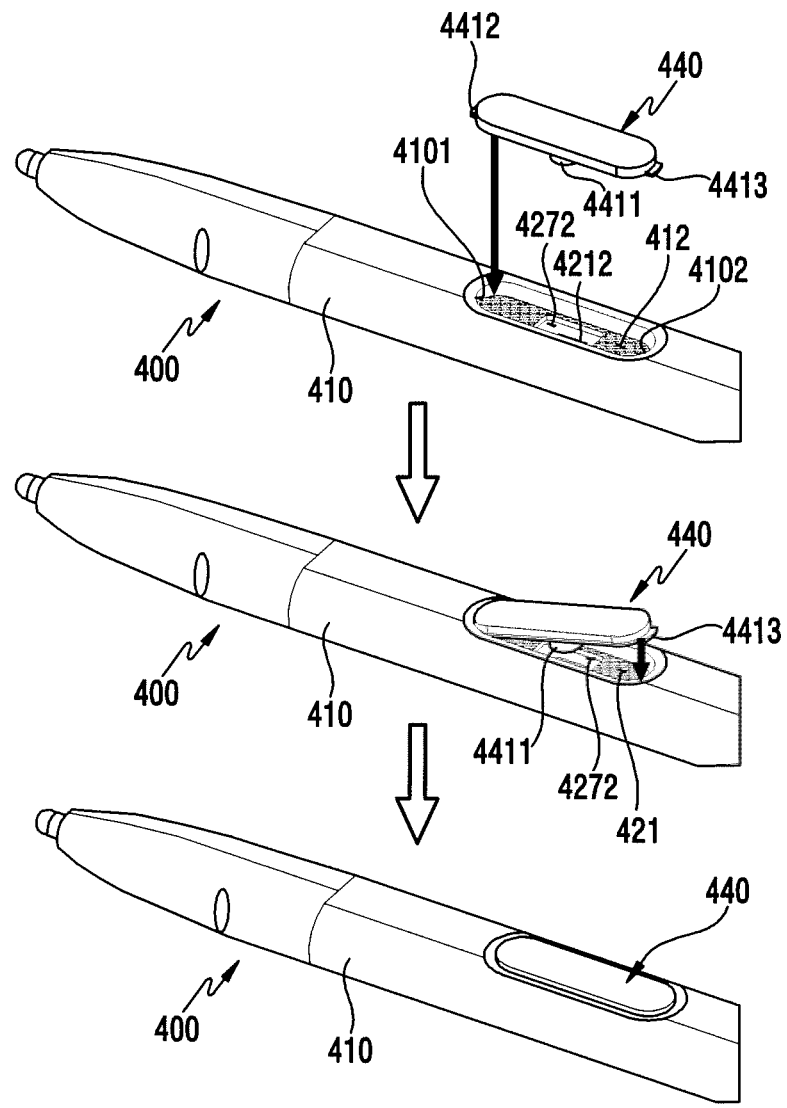
FIG. 4 illustrates a view showing a state in which a key button is assembled with a pen housing according to various exemplary embodiments of the present disclosure.

FIG. 4 illustrates a view showing a state in which a key button is assembled with a pen housing according to various exemplary embodiments of the present disclosure.

The key button 440 of FIG. 4 may be similar to the key button 340 of FIGS. 3A to 3D or another embodiment of the key button.

Referring to FIG. 4, the key button 440 may be mounted in a button receiving hole 412 formed on a certain area of a pen housing 410. According to an exemplary embodiment, the key button 440 may be mounted in the button receiving hole 412 that includes a switch 4212 mounted in a substrate exposure space 4272 excluding a packing member, on the outside of the pen housing 410 in which a substrate assembly is mounted. According to an exemplary embodiment, the key button 440 may be mounted in such a way that a first locking piece 4412 is locked with a first locking projection 4101 of the button receiving hole 412 first, and then, a second locking piece 4413 is locked with a second locking projection 4102 of the button receiving hole 412 in a tight-fitting way. In this case, a pressing protrusion 4411 of the key button 440 may be disposed on a location corresponding to the switch 4212.

According to various exemplary embodiments of the present disclosure, since the key button 440 is finally connected with the outside of the pen housing 410 after the substrate assembly is assembled with the pen housing 410 unlike in the related-art method, an assembly property can be enhanced.

Figure 5:
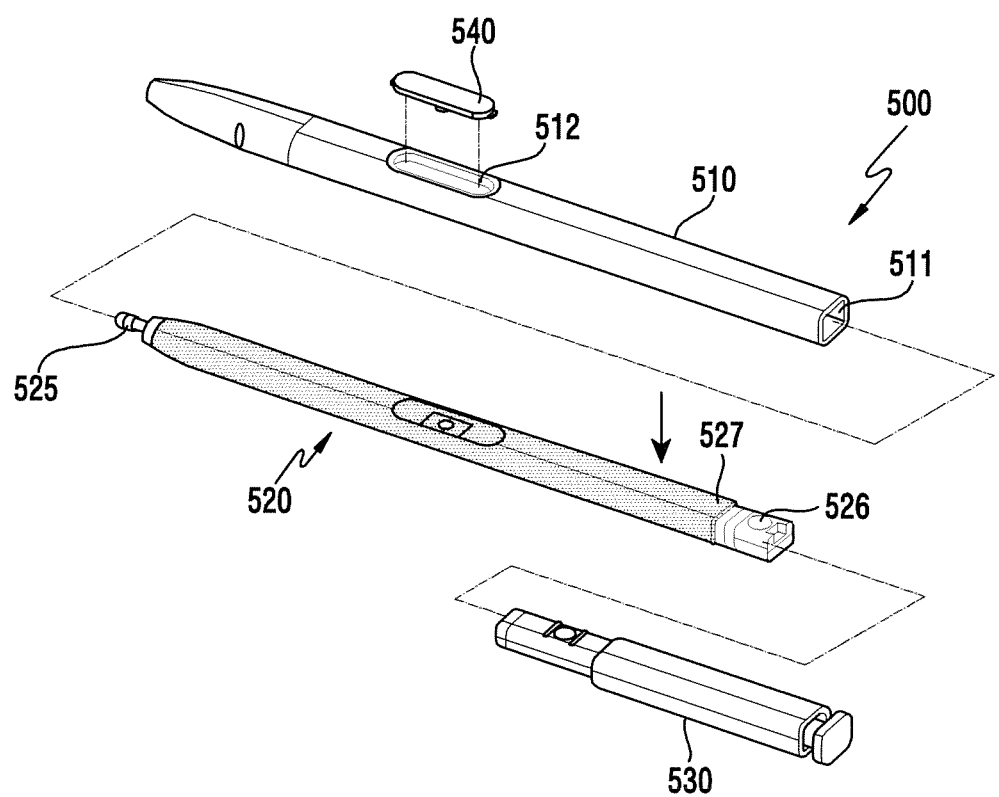
FIG. 5 illustrates an exploded perspective view of an electronic pen according to various exemplary embodiments of the present disclosure.

FIG. 5 illustrates an exploded perspective view of an electronic pen according to various exemplary embodiments.

The electronic pen 500 of FIG. 5 may be similar to the electronic pen 100 of FIG. 1 or another embodiment of the electronic pen.

Referring to FIG. 5, the electronic pen 500 may include a hollow type pen housing 510, a substrate assembly 520 that is mounted in an assembly receiving hole 511 corresponding to the hollow of the pen housing 610, a pen head 530 that finishes at an end of the pen housing 510 in which the substrate assembly 520 is mounted, and a key button 540 that is mounted in a button receiving hole 512 formed on an appropriate location of the pen housing 510.

According to various exemplary embodiments, although not shown, the substrate assembly 520 may include a pen pressure sensor, a coil holder, and a pen tip that are arranged on one side of the substrate in sequence, and a head bracket 526 that is connected with the pen head on the other side of the substrate as described above. The coil holder may include a coil wound therearound multiple times, and the pen tip may be installed to reach the pen pressure sensor in such a way that the pen tip penetrates through the coil holder.

According to various exemplary embodiments, the electronic pen 500 may include a waterproof/dustproof structure. According to an exemplary embodiment, a packing member 527 may be applied to the substrate. According to an exemplary embodiment, the packing member 527 may be disposed in such a way that it packs the entirety of the substrate assembly 520. According to an exemplary embodiment, the packing member 527 may entirely pack from at least a part of the head bracket 526 to at least a part of the coil holder. According to an exemplary embodiment, the packing member 527 may include at least one of rubber, urethane, silicon or a plastic resin. According to an exemplary embodiment, the packing member 527 may be formed by applying the entirety of the substrate assembly 520 to a mold, molding by injecting a liquid or semi-solid packing material, and then solidifying by cooling (including naturally cooling).

According to various exemplary embodiments, since the substrate assembly 520 entirely packed by the packing member 527 is connected to the pen housing 510, even when moisture permeates the pen housing 510, malfunction of the electronic pen 500 can be prevented in advance. According to an exemplary embodiment, waterproofing/dustproofing can be implemented by having at least some areas of the packing member 527 protrude along the outer circumference and tightly overlapping the protruding areas and the inner surface of the pen housing 510. However, this should not be considered as limiting. The waterproofing/dustproofing may be implemented by overlapping the entirety of the outer surface of the packing member 527 and the inner surface of the pen housing 510.

Figure 6B:
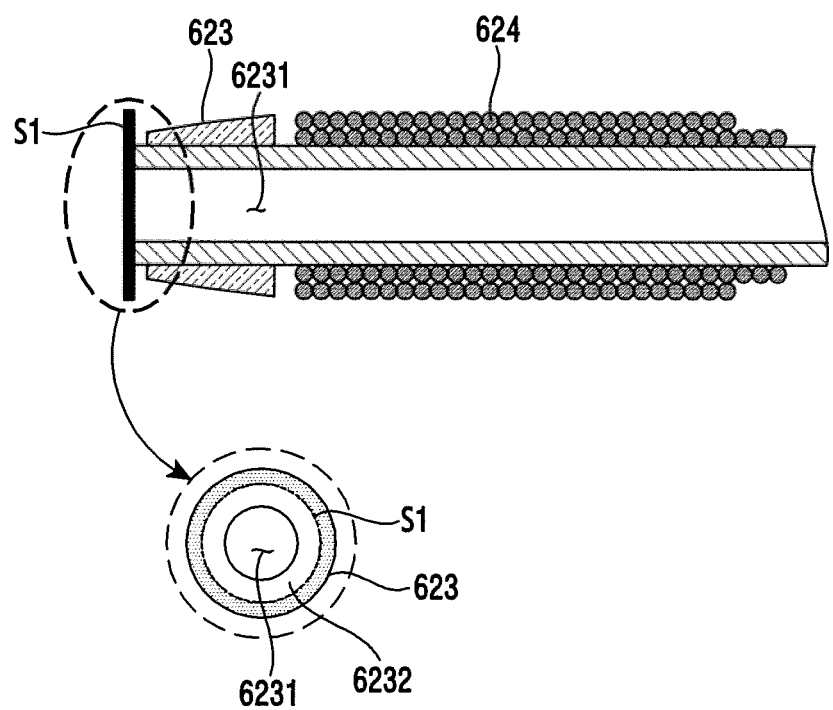
FIG. 6B illustrates a main part cross section view as viewed from line B-B' of FIG. 6A according to various exemplary embodiments of the present disclosure.
Figure 6C:
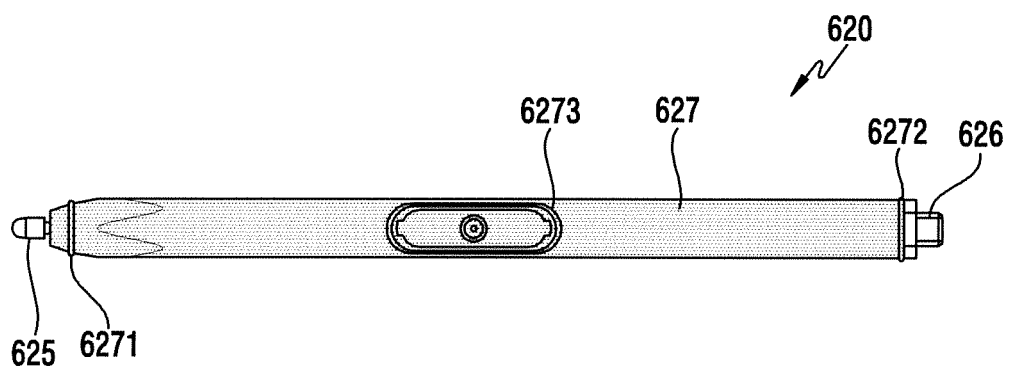
FIG. 6C illustrates a view showing a state in which a packing member is applied to the substrate assembly according to various exemplary embodiments of the present disclosure.
Figure 6D:
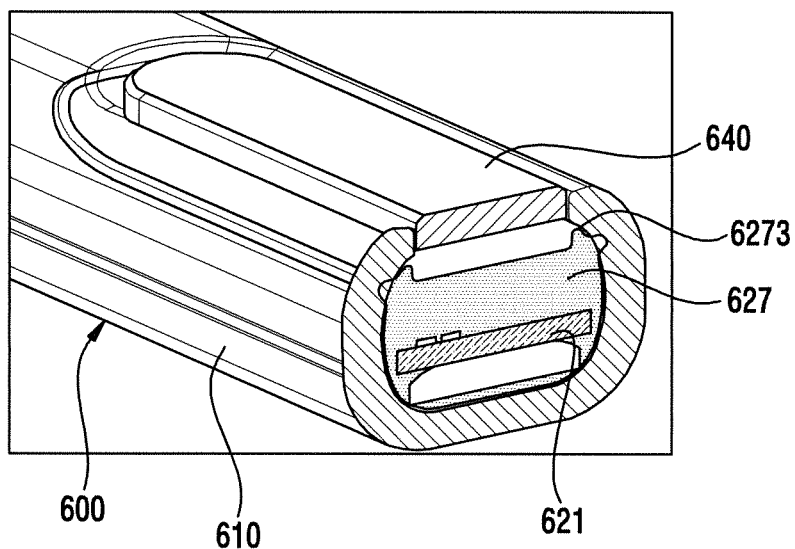
FIG. 6D illustrates a main part configuration view showing a state in which the packing member comes into contact with the pen housing according to various exemplary embodiments of the present disclosure.
Figure 6E:
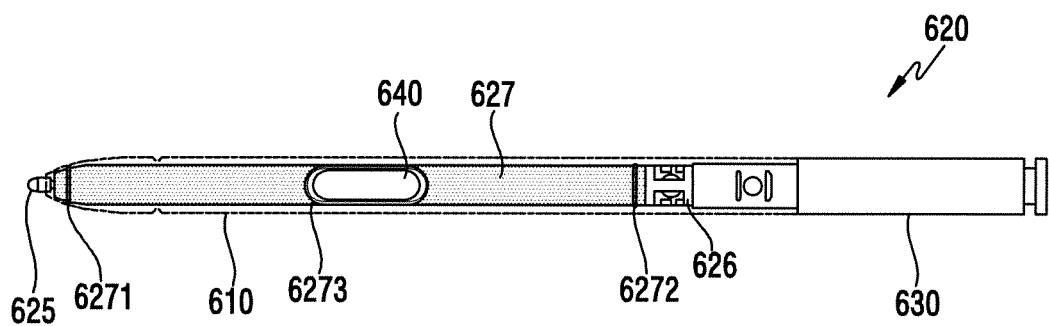
FIG. 6E illustrates a view of an electronic pen showing a state in which the substrate assembly to which the packing member is applied is assembled with the pen housing according to various exemplary embodiments of the present disclosure.

FIG. 6A illustrates a view showing a configuration of a substrate assembly according to various exemplary embodiments of the present disclosure. FIG. 6B illustrates a main part cross section view as viewed from line B-B' of FIG. 6A according to various exemplary embodiments of the present disclosure. FIG. 6C illustrates a view showing a state in which a packing member is applied to a substrate assembly according to various exemplary embodiments of the present disclosure. FIG. 6D illustrates a main part view showing a state in which the packing member comes into contact with a pen housing according to various exemplary embodiments of the present disclosure. FIG. 6E illustrates a view of an electronic pen showing a state in which the substrate assembly to which the packing member is applied is assembled with the pen housing according to various exemplary embodiments of the present disclosure.

The substrate assembly 620 and the other components of FIGS. 6A to 6E may be similar to the substrate assembly 520 and the other components of FIG. 5 or may be another embodiment of the substrate assembly and the other components.

Referring to FIGS. 6A and 6B, according to various exemplary embodiments, the substrate assembly 620 may include a substrate 621 on which a plurality of electronic components (electronic function group) 6211 are mounted, and a pen pressure sensor 622, a coil holder 623, and a pen tip 625 that are arranged on one side of the substrate 621 in sequence. The coil holder 623 may include a coil 624 wound therearound multiple times, and the pen tip 625 may be installed to reach the pen pressure sensor 622 in such a way that the pen tip 625 penetrates through the coil holder 623. According to an exemplary embodiment, the substrate assembly 620 may include a head bracket 626 connected with a pen head of the electronic pen on the other side of the substrate 621.

According to various exemplary embodiments, the substrate assembly 620 may be entirely packed by a packing member 627. According to an exemplary embodiment, the packing member 627 may include at least one of rubber, urethane, silicon, or a plastic resin. According to an exemplary embodiment, the packing member 627 may be formed by applying the entirety of the substrate assembly 620 to a mold, molding by injecting a liquid or semi-solid packing material, and then solidifying by cooling (including naturally cooling).

According to various exemplary embodiments, when the packing member 627 is molded by applying the mold, a first scraping line S1 may be applied to an end of the coil holder 623, and a second scraping line S2 may be applied to an end of the head bracket 626. According to an exemplary embodiment, a pen tip mounting hole 6231 may be formed on a pen tip mounting surface 6232 of the coil holder 623. According to an exemplary embodiment, the pen tip 625 may be mounted in such a way that at least a part of the pen tip 625 penetrates to at least a part of the pen pressure sensor 622. Accordingly, when the liquid or semi-solid packing member 627 is injected into the mold, including the coil holder 623, it is important to set the first scraping line S1. According to an exemplary embodiment, the first scraping line S1 may be applied to have a predetermined gap between the first scraping line S1 and the pen tip mounting hole 6231 of the coil holder. This is to prevent the injected liquid packing member by the first scraping line S1 from flowing into the pen tip mounting hole 6231.

Referring to FIG. 6C, the packing member 627 molded on the substrate assembly 620 may include a plurality of packing protrusions 6271, 6272, and 6273. According to an exemplary embodiment, the packing protrusions 6271, 6272, and 6273 may include a first packing protrusion 6271 that protrudes from a part of the pen tip 625 along the outer circumference of the packing member 627, a second packing protrusion 6272 that protrudes from the periphery of the head bracket 626 along the outer circumference of the packing member 627, and a third packing protrusion 6273 that protrudes from the outside of the packing member 627 in such a way that the third packing protrusion 6273 encloses an area including a switch 6212 of the substrate 621. According to an exemplary embodiment, the electronic pen 600 may prevent malfunction by means of a sealing structure formed by the packing member 627 of the substrate assembly 620 even when moisture flows into the pen housing. According to an exemplary embodiment, moisture can be prevented from flowing into the pen housing due to the presence of the plurality of packing protrusions 6271, 6272, and 6273 protruding to the outside of the packing member 627.

Referring to FIGS. 6D and 6E, when the substrate assembly 620, to which the packing member 627 having the packing protrusions 6271, 6272, and 6273 formed thereon is applied, is assembled with the pen housing 610, the first packing protrusion 6271 of the packing member 627 may tightly overlap the inner surface of the pen housing 610 on the pen tip 625 of the pen housing 610. According to an exemplary embodiment, the second packing protrusion 6272 of the packing member 627 may tightly overlap the inner surface of the pen housing 610 on the head bracket 626 of the pen housing 610. According to an exemplary embodiment, the third packing protrusion 6273 may tightly overlap the inner surface of the pen housing 610 on a portion of the pen housing 610 where the key button 640 is mounted.

Accordingly, when the substrate assembly 620 and the pen head 630 are completely assembled with the pen housing 610 of the electronic pen 600, moisture can be prevented from flowing through the pen tip 625 by the first packing protrusion 6271, moisture can be prevented from flowing through the pen head 630 by the second packing protrusion 6272, and moisture can be prevented from flowing through a connection portion of the key button 640 by the third packing protrusion 6273.

According to various exemplary embodiments, the key button 640 may be assembled with the pen housing 610 by means of the assembly structure of FIG. 3D and/or FIG. 4.

Figure 7:
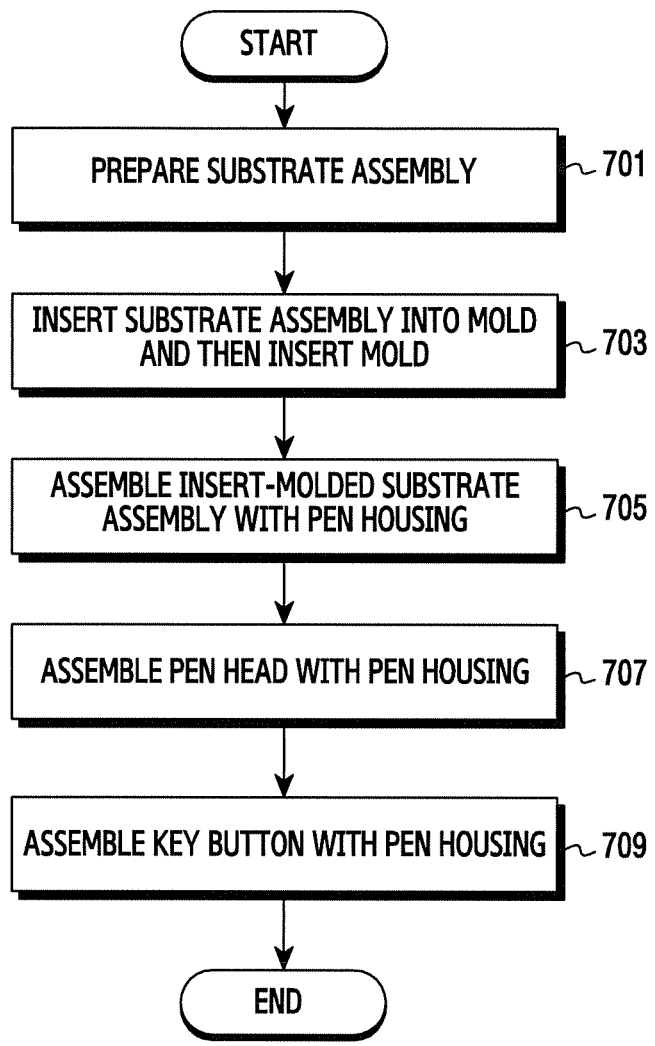
FIG. 7 illustrates a process flowchart showing an assembly order of an electronic pen according to various exemplary embodiments of the present disclosure.

FIG. 7 illustrates a process flowchart showing an assembly order of an electronic pen according to various exemplary embodiments of the present disclosure.

FIG. 7 will be explained with reference to the configurations of FIGS. 3A to 4 and FIGS. 6A to 6E described above.

Referring to FIG. 7, in operation 701, the substrate assembly 320, 620 may be prepared. According to an exemplary embodiment, the substrate assembly may include the substrate 321, 621 on which the plurality of electronic components (electronic function group) 3211, 6211 are mounted, and the pen pressure sensor 322, 622, the coil holder 323, 623, and the pen tip 325, 625 that are arranged on one side of the substrate 321, 621 in sequence. The coil holder 323, 623 may include the coil 324, 624 wound therearound multiple times, and the pen tip 325, 625 may be installed to reach the pen pressure sensor 322, 622 in such a way that the pen tip 325, 625 penetrates through the coil holder 323, 623. According to an exemplary embodiment, the substrate assembly 320, 620 may include the head bracket 326, 626 connected with the pen head 330, 630 of the electronic pen 300, 600 on the other side of the substrate 321, 621.

In operation 703, the substrate assembly 320, 620 may be inserted into a mold and the packing member 327, 627 may be applied by insert molding. According to an exemplary embodiment, the packing member 327 may be applied only to a substrate area as shown in FIGS. 3A to 3D. According to an exemplary embodiment, the packing member 627 may be applied to the entirety of the substrate assembly as shown in FIGS. 6A to 6E. According to an exemplary embodiment, the packing member 327, 627 may be formed, avoiding a portion of the substrate 321, 621 on which the switch 3212, 6212 is mounted.

In operation 705, the substrate assembly 320, 620 that is insert molded by the packing member 327, 627 may be assembled with the pen housing 310, 610. According to an exemplary embodiment, the substrate assembly 320, 620 including the packing member 327, 627 may be assembled in such a way that it is inserted into the pen housing 310. According to an exemplary embodiment, as shown in FIGS. 3A to 3D, the substrate assembly 320 can prevent external moisture from flowing into the pen housing 310 due to the presence of the packing ring 3231 disposed on the coil holder 323, and the first packing protrusion 3273 and the second packing protrusion 3271 formed on the packing member 327. According to an exemplary embodiment, as shown in FIGS. 6A to 6E, the substrate assembly 620 can prevent external moisture from flowing into the pen housing 610 due to the presence of the first packing protrusion 6271, the second packing protrusion 6272, and the third packing protrusion 6273 formed on the packing member 627.

In operation 707, the pen head 330, 630 may be assembled with the pen housing 310, 610. According to an exemplary embodiment, in a state in which the substrate assembly 320, 620 is mounted in the pen housing 310, 610, the pen head 330, 630 may be fixed to the pen housing 310, 610 using the head bracket 326, 626 disposed at one side of the substrate assembly 320, 620.

In operation 709, the key button 340, 440, 640 may be assembled with the pen housing 310, 410, 610. According to an exemplary embodiment, the key button 340, 440, 640 may be assembled with the pen housing 310, 410, 610 by means of the assembly structure of FIG. 3D and/or FIG. 4.

Figure 8:
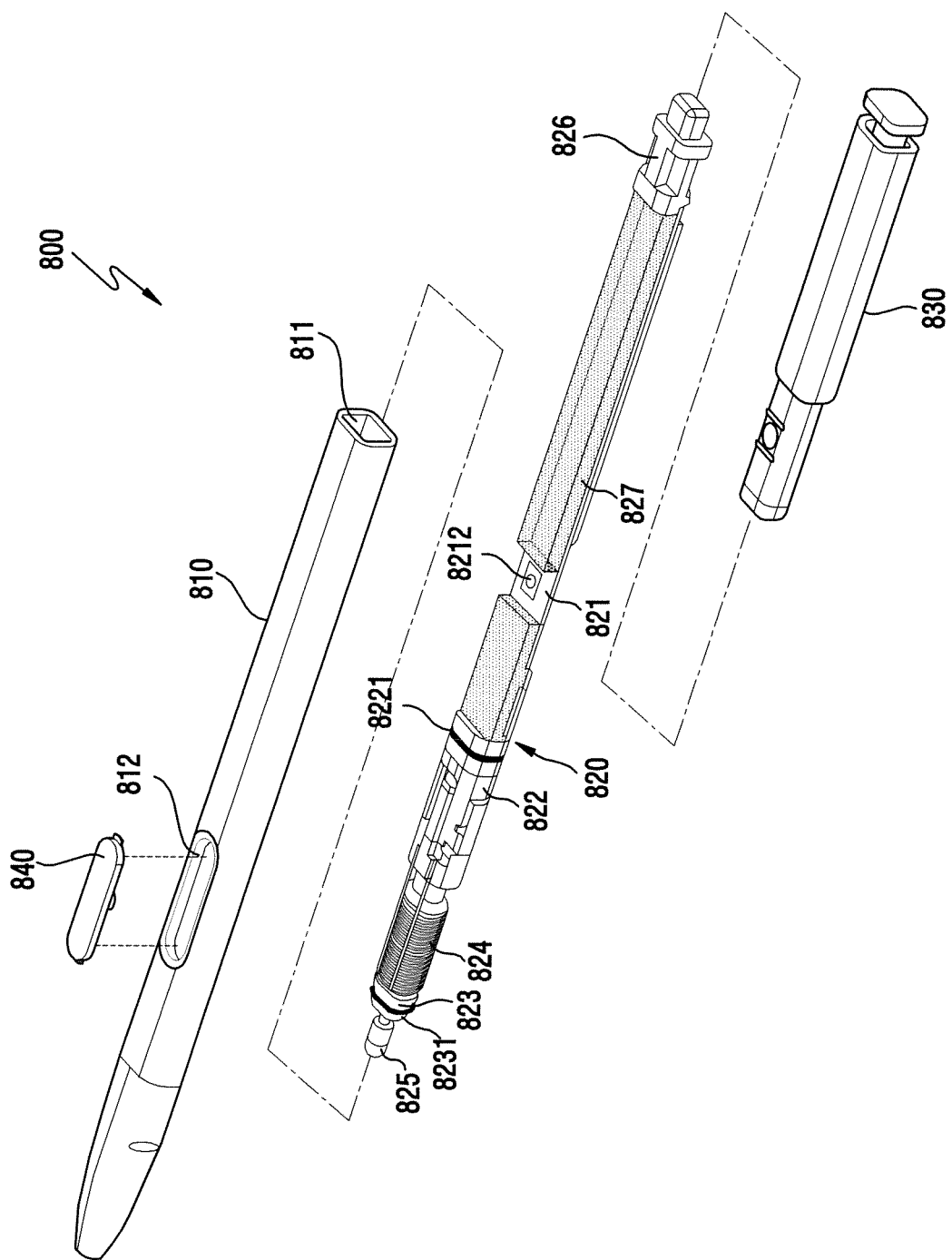
FIG. 8 illustrates an exploded perspective view of an electronic pen according to various exemplary embodiments of the present disclosure.

FIG. 8 illustrates an exploded perspective view of an electronic pen according to various exemplary embodiments of the present disclosure.

The electronic pen 800 of FIG. 8 may be similar to the electronic pen 100 of FIG. 1 or another embodiment of the electronic pen.

Referring to FIG. 8, the electronic pen 800 may include a hollow type pen housing 810, a substrate assembly 820 that is mounted in an assembly receiving hole 811 corresponding to the hollow of the pen housing 810, a pen head 830 that finishes at an end of the pen housing 810 in which the substrate assembly 820 is mounted, and a key button 840 that is mounted in a button receiving hole 812 formed on an appropriate location of the pen housing 810.

According to various exemplary embodiments, the substrate assembly 820 may include a pen pressure sensor 822, a coil holder 823, and a pen tip 825 that are arranged on one side of a substrate 821 in sequence, and a head bracket 826 that is connected with the pen head 830 on the other side of the substrate 821. The coil holder 823 includes a coil 824 wound therearound multiple times, and the pen tip 825 is installed to reach the pen pressure sensor 822 in such a way that it penetrates through the coil holder 823.

According to various exemplary embodiments, the electronic pen 800 may include a waterproof/dustproof structure. According to an exemplary embodiment, a packing member 827 may be applied to the substrate 821. According to an exemplary embodiment, the packing member 827 may be applied, avoiding an area of the substrate on which a switch 8212 is mounted. According to an exemplary embodiment, the switch 8212 may include a waterproof dome, and an exposed part of the substrate 821 on which the switch 8212 is mounted may include an area that is water-resistant even when it comes into contact with moisture. According to an exemplary embodiment, the electronic pen 800 may include a first packing ring 8231 that is disposed in such a way that it encloses at least a part of the outer surface of the coil holder 823, and a second packing ring 8221 that is disposed in such a way that it encloses at least a part of the outer surface of the pen pressure sensor 822 in order to prevent moisture flowing through the button receiving hole 812 from flowing in the direction of the coil. According to an exemplary embodiment, the first packing ring 8231 and the second packing ring 8221 may be formed of rubber, urethane, or silicon. According to an exemplary embodiment, the first packing ring 8231 and the second packing ring 8221 may be independently formed on the coil holder 823 and the pen pressure sensor 822 or may be integrally formed when the coil holder 823 or the pen pressure sensor 822 is formed of rubber, silicon, or urethane.

According to various exemplary embodiments, the packing member 827 may be applied to the top surface of the substrate 821 in such a way that the packing member 827 seals a plurality of electronic components arranged on the substrate 821, and then may be solidified. However, this should not be considered as limiting. The packing member 827 may be disposed in such a way that it extends to the bottom surface of the substrate 821 as well as the top surface of the substrate 821. According to an exemplary embodiment, the packing member 827 may be applied with a liquid or semi-solid material of acrylic, rubber, and fluorine series, and then may be cured using a natural curing method, an ultraviolet (UV) curing method, or a curing method using heat.

According to various exemplary embodiments, when the substrate assembly 820 is assembled with the pen housing 810, the first packing ring 8231 may tightly overlap the inner surface of the pen housing 810 on the pen tip 825, such that waterproofing/dustproofing can be implemented. According to an exemplary embodiment, the second packing ring 8221 may tightly overlap the inner surface of the pen housing 810 on the pen pressure sensor 822, such that moisture flowing through the button receiving hole 812 of the pen housing 810 can be prevented from flowing in the direction of the coil 824.

Figure 9A:
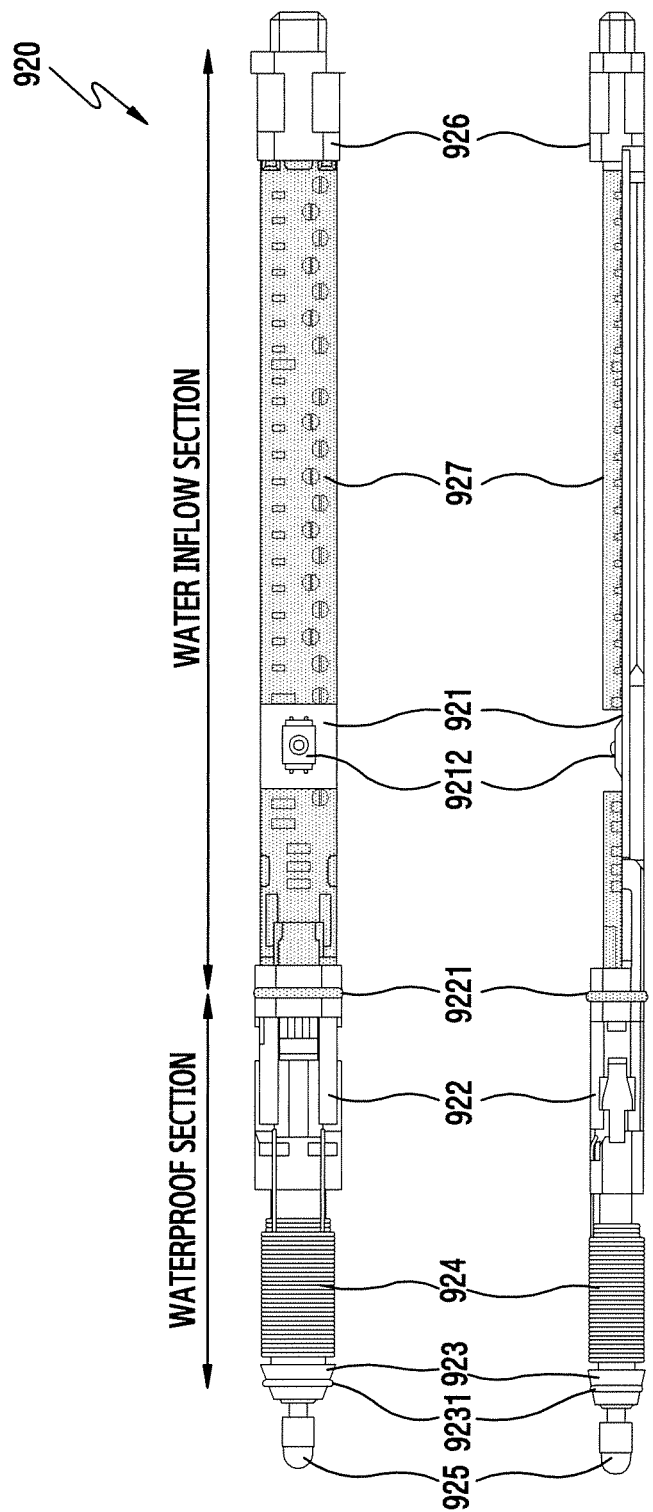
FIG. 9A illustrates a view showing a state in which a packing member is applied to a substrate assembly according to various exemplary embodiments of the present disclosure.
Figure 9B:
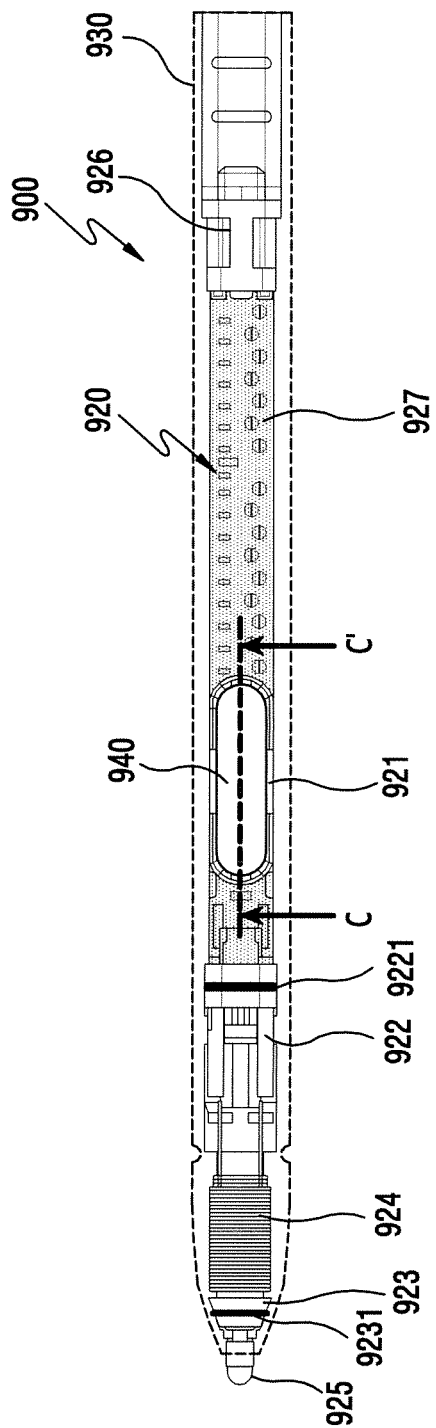
FIG. 9B illustrates a view showing a state in which the substrate assembly to which the packing member is applied is mounted in the pen housing according to various exemplary embodiments of the present disclosure.
Figure 9C:
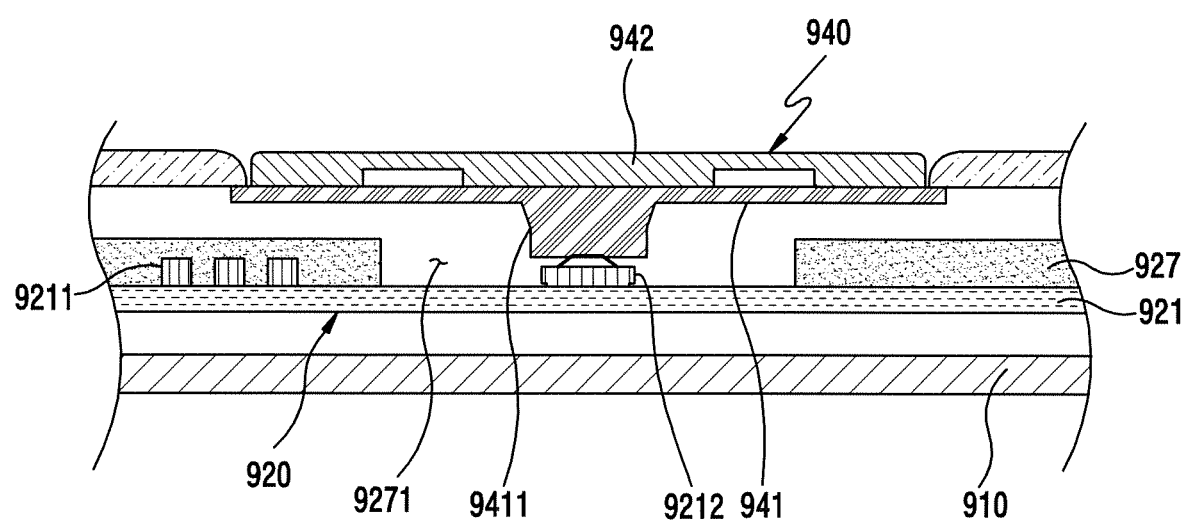
FIG. 9C illustrates a main part cross section view as viewed from line C-C' of FIG. 9B according to various exemplary embodiments of the present disclosure.

FIG. 9A illustrates a view showing a state in which a packing member is applied to a substrate assembly according to various exemplary embodiments of the present disclosure. FIG. 9B illustrates a view showing a state in which the substrate assembly to which the packing member is applied is mounted in a pen housing according to various exemplary embodiments of the present disclosure. FIG. 9C illustrates a main part cross section view as viewed from line C-C' of FIG. 9B according to various exemplary embodiments of the present disclosure.

The substrate assembly 920 and the other components of FIGS. 9A to 9C may be similar to the substrate assembly 820 and the other components of FIG. 8 or may be another embodiment of the substrate assembly and the other components.

Referring to FIG. 9A, the substrate assembly 920 may include a substrate 921 on which a plurality of electronic components (electronic function group) 9211 (see FIG. 9C) are mounted, and a pen pressure sensor 922, a coil holder 923, and a pen tip 925 that are arranged on one side of the substrate 921 in sequence. The coil holder 923 may include a coil 924 wound therearound multiple times, and the pen tip 925 may be installed to reach the pen pressure sensor 922 in such a way that the pen tip 925 penetrates through the coil holder 923. According to an exemplary embodiment, the substrate assembly 920 may include a head bracket 926 connected with a pen head 930 of the electronic pen on the other side of the substrate 921.

According to various exemplary embodiments, a packing member 927 may be applied to the substrate 921. According to an exemplary embodiment, the packing member 927 may be applied to the top surface of the substrate 921 in such a way that the packing member 927 seals a plurality of electronic components arranged on the substrate 921 and then may be solidified. However, this should not be considered as limiting. The packing member 927 may be disposed in such a way that the packing member 927 extends to the bottom surface of the substrate 921 as well as the top surface of the substrate 921. According to an exemplary embodiment, the packing member 927 may be applied with a liquid or semi-solid material of acrylic, rubber, or fluorine series, and then may be cured using a natural curing method, a UV curing method, or a curing method using heat.

According to various exemplary embodiments, a switch 9212 may be disposed on the substrate 921 in such a way that it is recessed from the packing member 927. According to an exemplary embodiment, the switch 9212 may include a waterproof dome and an area of the substrate 921 excluding the packing member 927 may include an area that is water-resistant even when moisture permeates.

According to an exemplary embodiment, the substrate assembly 920 may include a first packing ring 9231 that is disposed in such a way that it encloses at least a part of the outer circumference of the coil holder 923, and a second packing ring 9221 that is disposed in such a way that it encloses at least a part of the outer circumference of the pen pressure sensor 922 in order to prevent moisture flowing through a button receiving hole from flowing in the direction of the coil. According to an exemplary embodiment, the first packing ring 9231 and the second packing ring 9221 may be formed of rubber, urethane, or silicon. According to an exemplary embodiment, the first packing ring 9231 and the second packing ring 9221 may be independently formed on the coil holder 923 and the pen pressure sensor 922, or may be integrally formed when the coil holder 923 or the pen pressure sensor 922 is formed of rubber, silicon, or urethane.

Referring to FIGS. 9B and 9C, when the substrate assembly 920 is assembled with the pen housing 910, the first packing ring 9231 may tightly overlap the inner surface of the pen housing 910 on the pen tip 925, such that waterproofing/dustproofing can be implemented. According to an exemplary embodiment, the second packing ring 9221 may tightly overlap the inner surface of the pen housing 910 on the pen pressure sensor 922, such that moisture flowing through a button receiving hole of the pen housing 910 can be prevented from flowing in the direction of the coil.

According to various exemplary embodiments, when a key button 940 including a key base 941 and a key top 942 is assembled with the pen housing 910 and then is operated, moisture may flow into a packing member recess space 9271 of the pen housing 910. However, such moisture does not influence electronic components mounted on the substrate 921 due to the presence of the packing member 927, and can be prevented by the second packing member 9221 from flowing in the direction of the coil.

Figure 10:
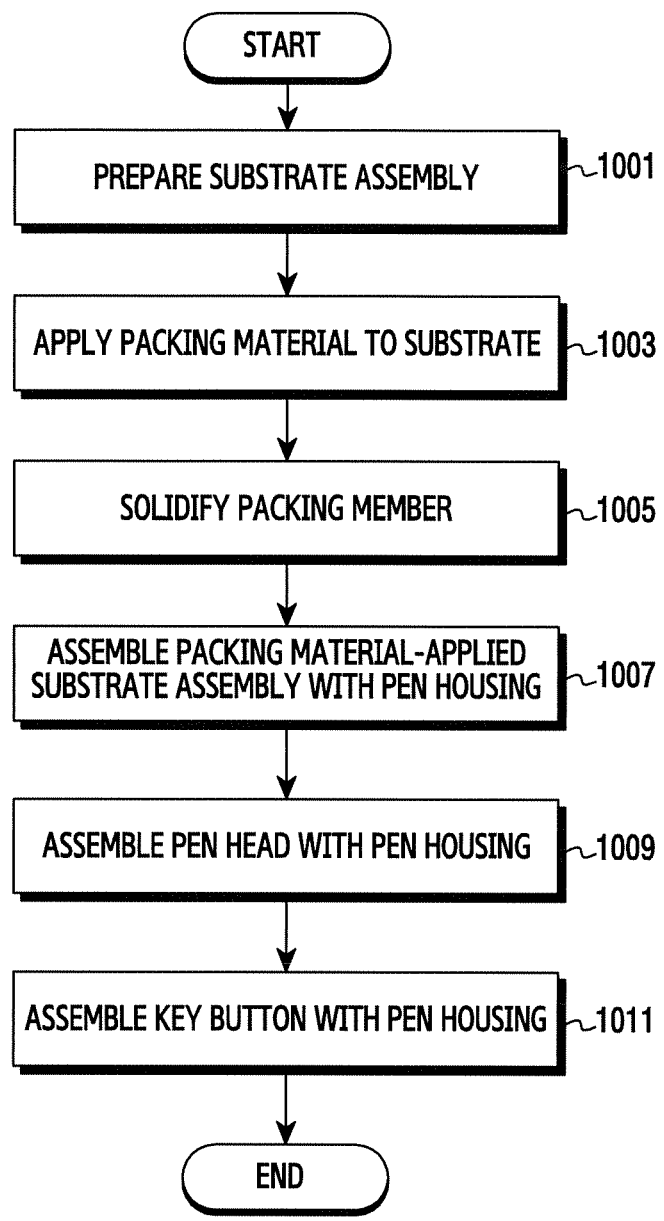
FIG. 10 illustrates a process flowchart showing an assembly order of an electronic pen according to various exemplary embodiments of the present disclosure.

FIG. 10 illustrates a process flowchart showing an assembly order of an electronic pen according to various exemplary embodiments of the present disclosure.

FIG. 10 will be explained with reference to the configuration of FIGS. 9A to 9C described above.

Referring to FIG. 10, in operation 1001, the substrate assembly 920 may be prepared. According to an exemplary embodiment, the substrate assembly 920 may include the substrate 921 on which the plurality of electronic components (electronic function group) 9211 are mounted, and the pen pressure sensor 922, the coil holder 923, and the pen tip 925 that are arranged on one side of the substrate 921 in sequence. The coil holder 923 may include the coil 924 wound therearound multiple times, and the pen tip 925 may be installed to reach the pen pressure sensor 922 in such a way that the pen tip 925 penetrates through the coil holder 923. According to an exemplary embodiment, the substrate assembly 920 may include the head bracket 926 that is connected with the pen head 930 of the electronic pen 900 on the other side of the substrate 921.

In operation 1003, a packing member may be applied to the substrate of the substrate assembly 920. According to an exemplary embodiment, the packing member may be applied, avoiding a switch mounted in the substrate, and may be solidified in operation 1005. According to an exemplary embodiment, the packing member 927 may be applied to the bottom surface of the substrate 921 as well as the top surface of the substrate 921. According to an exemplary embodiment, the packing member 927 may be applied with a liquid or semi-solid material of acrylic, rubber, or fluorine series, and then may be cured in a natural curing method, a UV curing method, or a curing method using heat.

In operation 1007, when the packing member applied to the substrate is solidified, the substrate assembly including the packing member may be assembled with the pen housing. According to an exemplary embodiment, in this case, the first packing ring 9231 may tightly overlap the inner surface of the pen housing 910 on the pen tip 925, such that waterproofing/dustproofing can be implemented. According to an exemplary embodiment, the second packing ring 9221 may tightly overlap the inner surface of the pen housing 910 on the pen pressure sensor 922, such that moisture flowing through the button receiving hole of the pen housing 910 can be prevented from flowing in the direction of the coil.

In operation 1009, the pen head 930 may be assembled with the pen housing 910. According to an exemplary embodiment, in a state in which the substrate assembly 920 is mounted in the pen housing 910, the pen head 930 may be fixed to the pen housing 910 using the head bracket 926 that is disposed on one side of the substrate assembly 920.

In operation 1011, the key button 940 may be assembled with the pen housing 910. According to an exemplary embodiment, the key button 940 may be assembled with the pen housing 910 by means of the assembly structure of FIG. 3D and/or FIG. 4.

Figure 11:
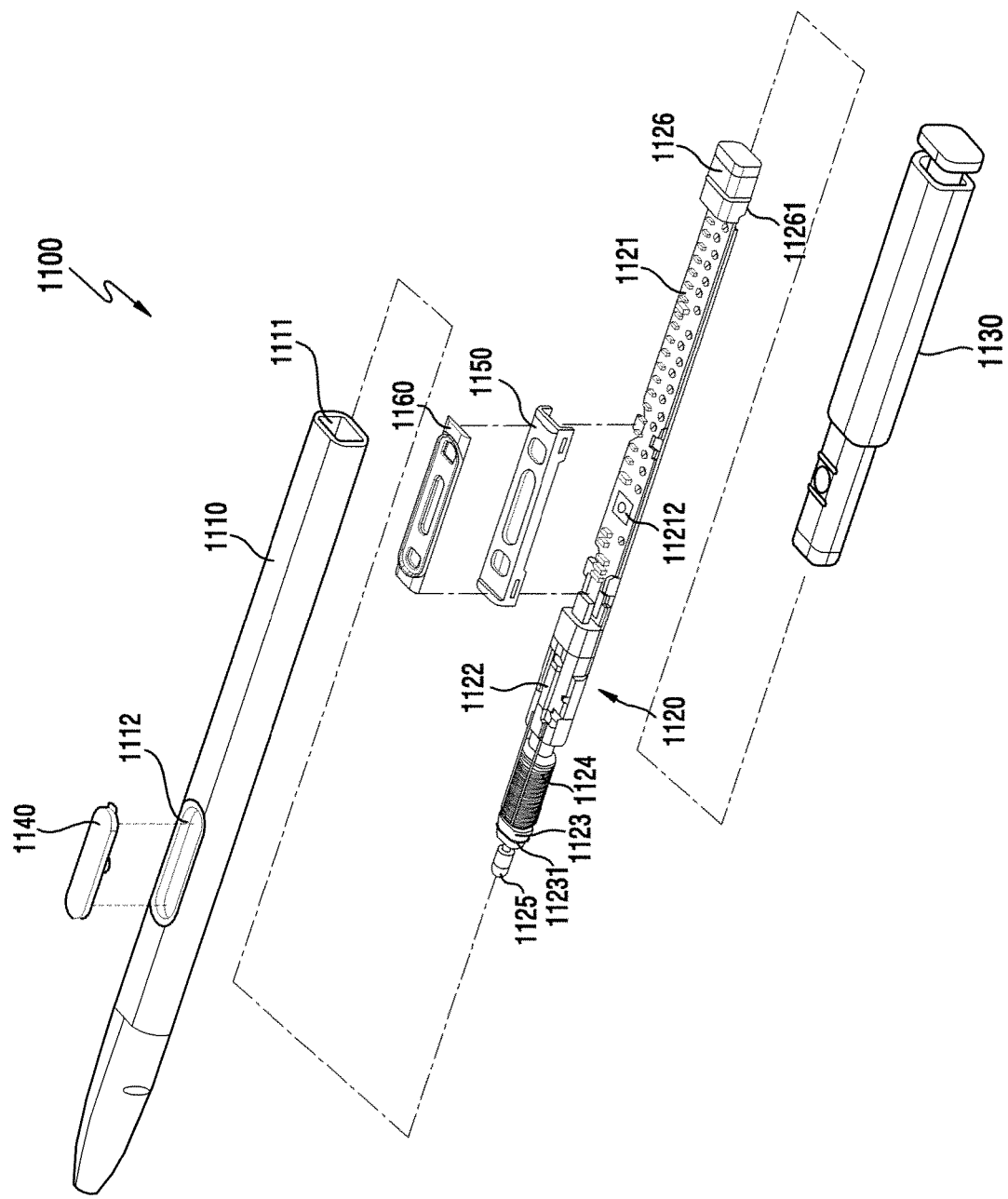
FIG. 11 illustrates an exploded perspective view of an electronic pen according to various exemplary embodiments of the present disclosure.

FIG. 11 illustrates an exploded perspective view of an electronic pen according to various exemplary embodiments of the present disclosure.

The electronic pen 1100 of FIG. 11 may be similar to the electronic pen 100 of FIG. 1 or may be another embodiment of the electronic pen.

Referring to FIG. 11, the electronic pen 1100 may include a hollow type pen housing 1110, a substrate assembly 1120 that is mounted in an assembly receiving hole 1111 corresponding to the hollow of the pen housing 1110, a pen head 1130 that finishes at an end of the pen housing 1110 in which the substrate assembly 1120 is mounted, and a key button 1140 that is mounted in a button receiving hole 1112 formed on an appropriate location of the pen housing 1110.

According to various exemplary embodiments, the substrate assembly 1120 may include a pen pressure sensor 1122, a coil holder 1123, and a pen tip 1125 that are arranged on one side of a substrate 1121 in sequence, and a head bracket 1126 that is connected with the pen head 1130 on the other side of the substrate 1121. The coil holder 1123 may include a coil 1124 wound therearound multiple times, and the pen tip 1125 may be installed to reach the pen pressure sensor 1122 in such a way that the pen tip 1125 penetrates through the coil holder 1123.

According to various exemplary embodiments, the electronic pen 1100 may include a waterproof/dustproof structure. According to an exemplary embodiment, a packing member 1160 may be applied to the substrate 1121 to prevent moisture from flowing from the button receiving hole 1112 of the pen housing. According to an exemplary embodiment, the packing member 1160 may be installed on a support bracket 1150 disposed on the substrate, and may be disposed in such a way that the packing member 1160 tightly overlaps the inner surface of the button receiving hole 1112 along the edge of the button receiving hole 1112.

According various exemplary embodiments, the electronic pen 1100 may include a first packing ring 11231 that is disposed in such a way that the first packing ring 11231 encloses at least a part of the outer circumference of the coil holder 1123, and a second packing ring 11261 that is disposed in such a way that the second packing ring 11261 encloses at least a part of the outer circumference of the head bracket 1126. According to an exemplary embodiment, the first and second packing rings 11231, 11261 may be formed of rubber, urethane, or silicon. According to an exemplary embodiment, the first and second packing rings 11231, 11261 may be independently formed on the coil holder 1123 and the head bracket 1126, or may be integrally formed when the coil holder 1123 or the head bracket 1126 is formed of rubber, silicon, or urethane.

According to various exemplary embodiments, the packing member 1160 may be fixed to the support bracket 1150 fixed to the substrate 1121 in a method such as bonding or the like, and may come into contact with the inner surface of the pen housing 1110 to prevent moisture flowing through the button receiving hole 1112 from permeating.

According to various exemplary embodiments, when the substrate assembly 1120 is assembled with the pen housing 1110, the first packing ring 11231 may tightly overlap the inner surface of the pen housing 1110 on the pen tip 1125, such that waterproofing/dustproofing can be implemented. According to an exemplary embodiment, the second packing ring 11261 may tightly overlap the inner surface of the pen housing 1110 on the head bracket 1126, such that waterproofing/dustproofing can be implemented.

Figure 12A:
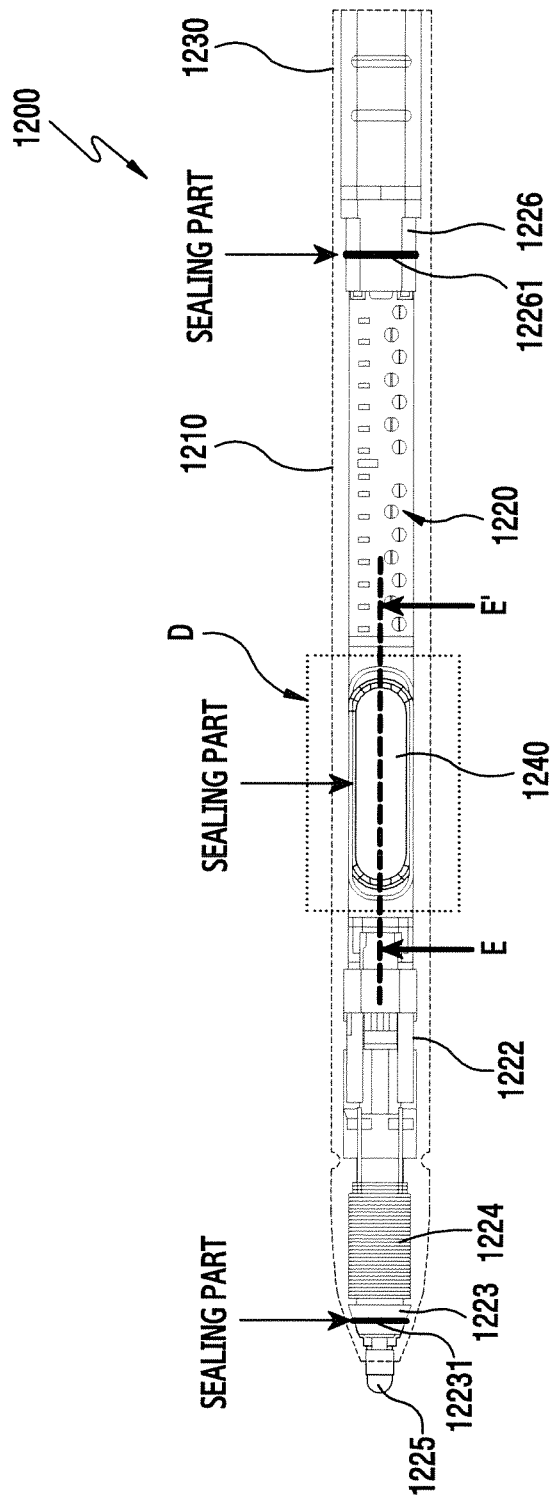
FIG. 12A illustrates a view showing a state in which a substrate assembly is assembled with a pen housing according to various exemplary embodiments of the present disclosure.
Figure 12B:
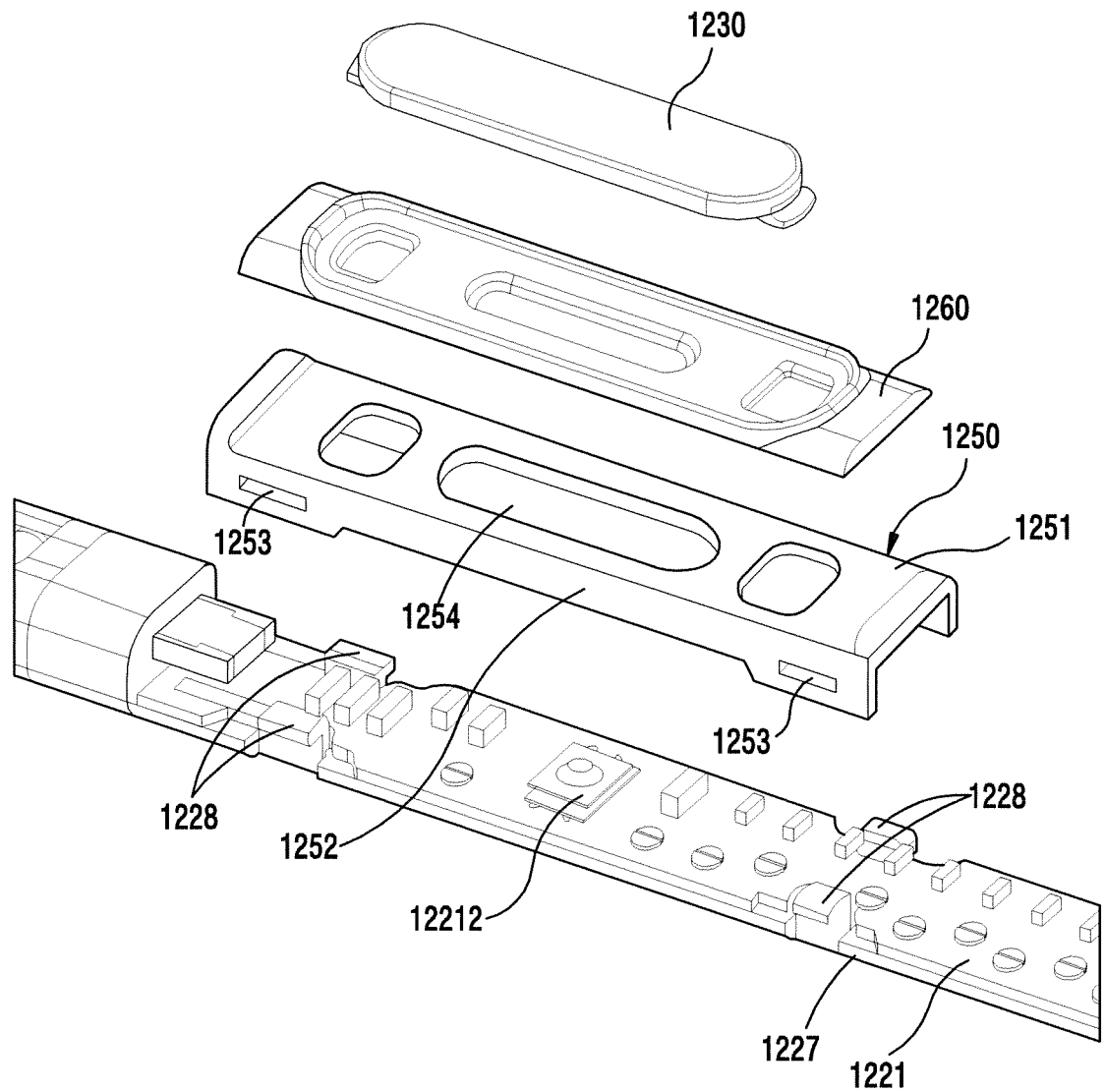
FIG. 12B illustrates an exploded perspective view showing an assembly structure of a key button that is disposed on a D area of FIG. 12A according to various exemplary embodiments of the present disclosure.
Figure 12C:
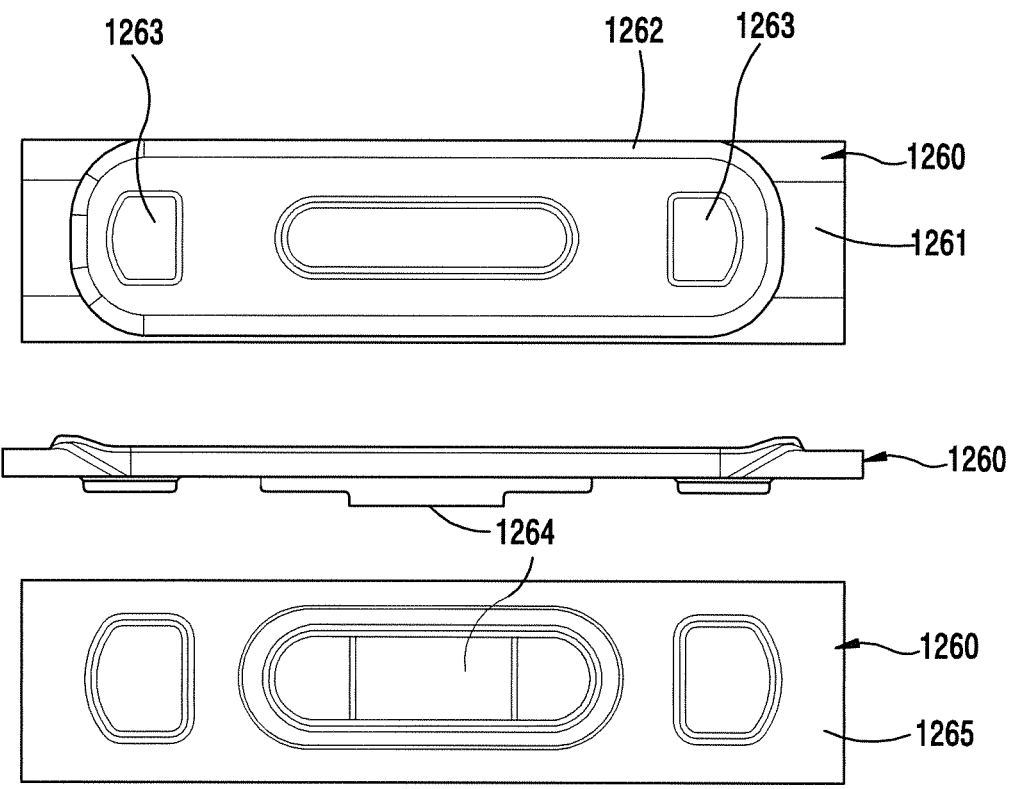
FIG. 12C illustrates a view showing a configuration of a packing member for assembling a key button according to various exemplary embodiments of the present disclosure.
Figure 12D:
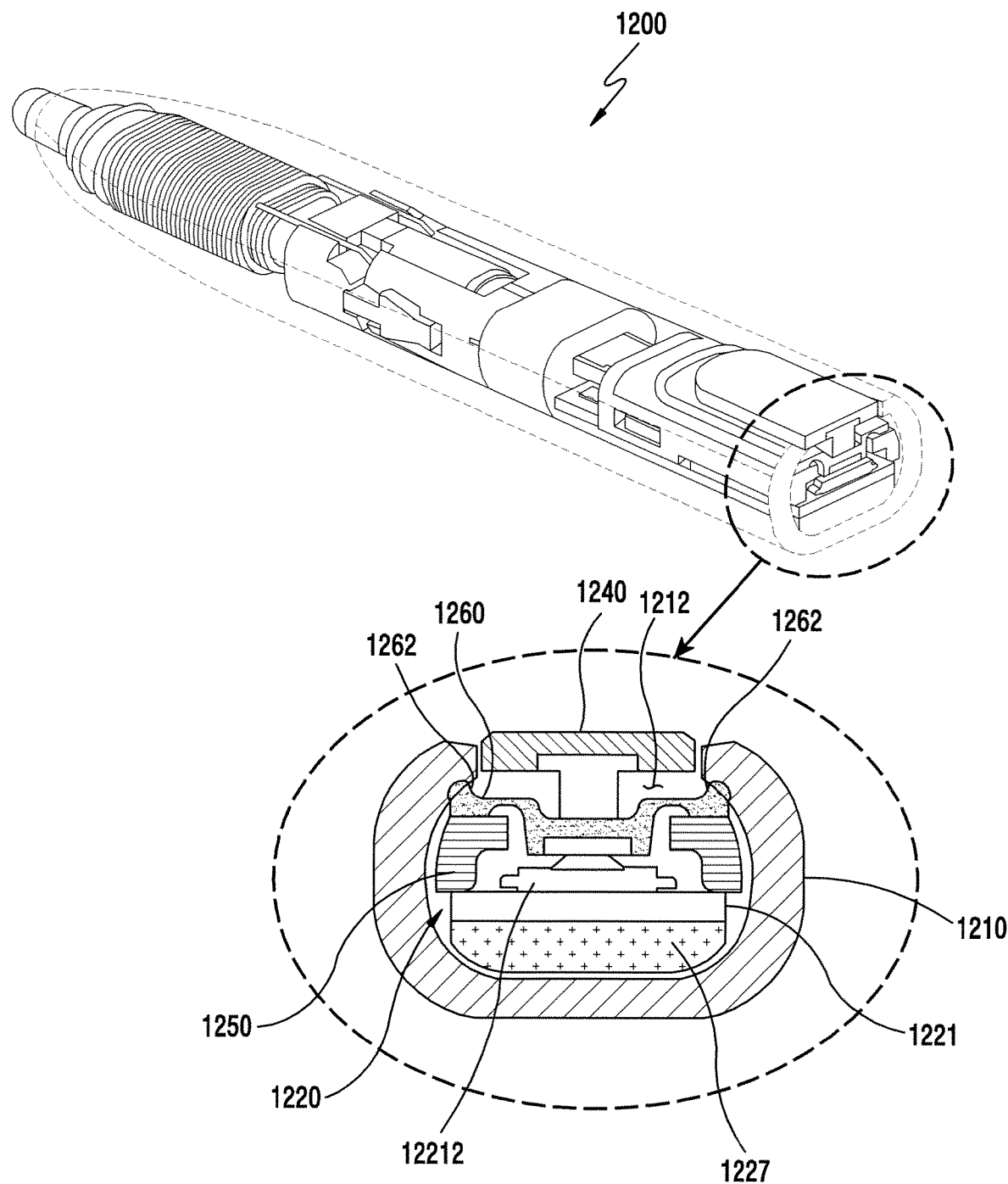
FIG. 12D illustrates a main part configuration view showing a state in which the packing member comes into contact with the pen housing according to various exemplary embodiments of the present disclosure.
Figure 12E:
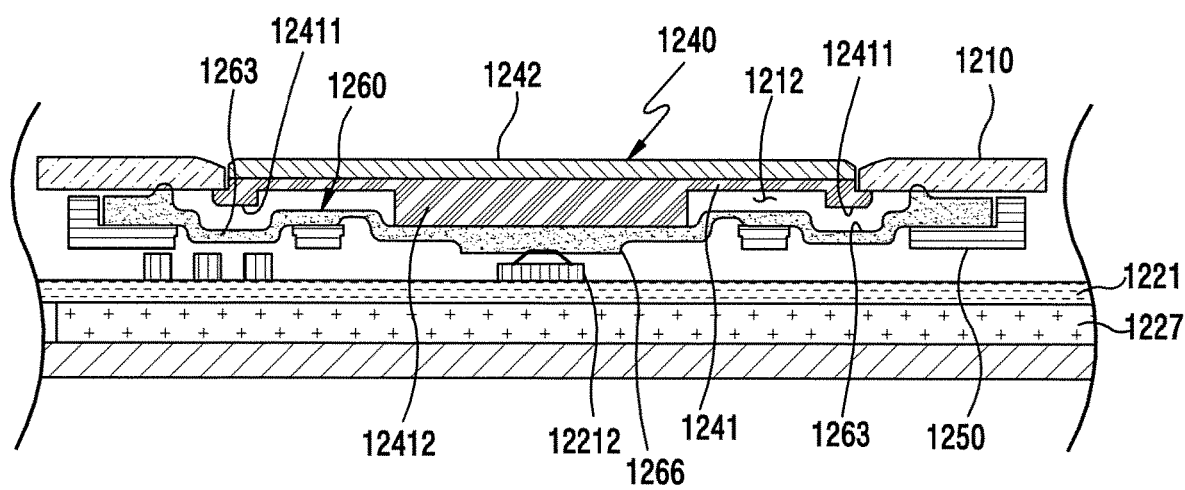
FIG. 12E illustrates a main part configuration view showing a key button assembly structure to which the packing member is applied according to various exemplary embodiments of the present disclosure.

FIG. 12A illustrates a view showing a state in which a substrate assembly is assembled with a pen housing according to various exemplary embodiments of the present disclosure. FIG. 12B illustrates an exploded perspective view showing an assembly structure of a key button that is disposed on a D area of FIG. 12A according to various exemplary embodiments of the present disclosure. FIG. 12C illustrates a view showing a configuration of a packing member for assembling the key button according to various exemplary embodiments of the present disclosure. FIG. 12D illustrates a main part configuration view showing a state in which the packing member comes into contact with the pen housing according to various exemplary embodiments of the present disclosure. FIG. 12E illustrates a main part cross section view showing the key button assembly structure to which the packing member is applied according to various exemplary embodiments of the present disclosure.

The substrate assembly 1220 and the other components of FIGS. 12A to 12E may be similar to the substrate assembly 820 and the other components of FIG. 8, or may be another embodiment of the substrate assembly and the other components.

Referring to FIG. 12A, the substrate assembly 1220 that is mounted in the pen housing 1210 of the electronic pen 1200 may include a substrate 1121 on which a plurality of electronic components are mounted, and a pen pressure sensor 1222, a coil holder 1223, and a pen tip 1225 that are arranged on one side of the substrate 1221 in sequence. The coil holder 1223 may include a coil 1224 wound therearound multiple times, and the pen tip 1225 may be installed to reach the pen pressure sensor 1222 in such a way that the pen tip 1225 penetrates through the coil holder 1223. According to an exemplary embodiment, the substrate assembly 1220 may include a head bracket 1226 that is connected with a pen head 1230 of the electronic pen on the other side of the substrate 1221. According to an exemplary embodiment, the electronic pen 1200 may include the pen head 1230 that is connected thereto through the head bracket 1226.

According to various exemplary embodiments, a packing member 1260 (see FIG. 12B) may be applied to the D area of the substrate 1221 in which a key button 1240 is installed. According to an exemplary embodiment, the packing member 1260 may be independently provided, and may be fixed to a support bracket 1250 (see FIG. 12B) fixed to the substrate 1221 and may tightly overlap the inner surface of the pen housing 1210 in such a way that the packing member 1260 encloses a button receiving hole 1212 (see FIG. 12D).

According various exemplary embodiments, the substrate assembly 1220 may include a first packing ring 12231 that is disposed in such a way that the first packing ring 12231 encloses at least a part of the outer circumference of the coil holder 1223, and a second packing ring 12261 that is disposed in such a way that the second packing ring 12261 encloses at least a part of the outer circumference of the head bracket 1226. According to an exemplary embodiment, the first and second packing rings 12231, 12261 may be formed of rubber, urethane, or silicon. According to an exemplary embodiment, the first and second packing rings 12231, 12261 may be independently formed on the coil holder 1223 and the head bracket 1226, or may be integrally formed when the coil holder 1223 or the head bracket 1226 is formed of rubber, silicon, or urethane.

According to various exemplary embodiments, when the substrate assembly 1220 is assembled with the pen housing 1210, the first packing ring 12231 may tightly overlap the inner surface of the pen housing 1210 on the pen tip 1225, such that waterproofing/dustproofing can be implemented. According to an exemplary embodiment, the second packing ring 12261 may tightly overlap the inner surface of the pen housing 1210 on the head bracket 1226, such that waterproofing/dustproofing can be implemented.

Referring to FIG. 12B, the key button assembly structure of the electronic pen 1200 may include the substrate 1221, the support bracket 1250 that is fixed to the substrate 1221, and the packing member 1260 that is fixed to a top surface 1251 of the support bracket 1250. According to an exemplary embodiment, the substrate 1221 may be fixed to a substrate support 1227 disposed on the lower side thereof.

According to various exemplary embodiments, the support bracket 1250 may include the top surface 1251 and a side surface 1252 that downwardly extends from at least some areas of the top surface 1251 along the edge of the top surface 1251. According to an exemplary embodiment, the support bracket 1250 may be formed in a substantially rectangular shape, and may include an opening 1254 formed on an area of the top surface 1251 corresponding to a switch 12212 mounted on the substrate 1221. According to an exemplary embodiment, a plurality of locking grooves 1253 may be formed on the side surface 1252 of the support bracket 1250. According to an exemplary embodiment, the substrate support 1227 may include a plurality of hooks 1228 formed on locations corresponding to the locking grooves 1253. Accordingly, the support bracket 1250 may be fixed in such a way that the hooks 1228 of the substrate support 1227 are locked into the locking grooves 1253 (for example, a snap-fit connection structure). However, this should not be considered as limiting. Hooks may be formed on the support bracket 1250 and locking grooves may be formed on corresponding locations of the substrate support 1227, such that the hooks and the grooves may be connected with each other.

According to various exemplary embodiments, the packing member 1260 may be fixed to the top surface 1251 of the support bracket 1250 in a method such as bonding or the like. According to an exemplary embodiment, the packing member 1260 may be formed of rubber, silicon, or urethane.

Referring to FIG. 12C, the packing member 1260 may have a skirt structure for operating the switch 12212 mounted on the substrate 1221 disposed on the lower side of the packing member 1260 according to a pressing operation of the key button 1240 formed above the packing member 1260. According to an exemplary embodiment, the packing member 1260 may include the button receiving hole 1212 of the pen housing 1210, and a packing protrusion 1262 that is formed in a closed loop shape to enclose the edge of the button receiving hole 121 on the inner surface of the pen housing 1210. According to an exemplary embodiment, the packing member 1260 may include a pressing part 1264 that is disposed inside the packing protrusion 1262, for easily pressing the switch 12212 by the pressing operation of the key button 1240, and locking piece receiving grooves 1263 that are formed on opposite sides of the pressing part 1264 to smoothly induce the operation of locking pieces 12411 (see FIG. 12E) of the key button 1240. According to an exemplary embodiment, the pressing part 1264 may protrude from a location of a bottom surface 1265 of the packing member 1260 corresponding to the switch. According to an exemplary embodiment, the locking piece receiving grooves 1263 may be formed to be lower than the top surface 1261 of the packing member 1260, such that the locking pieces 12411 of the key button 1240 are received on the top surface 1261 of the packing member 1260.

Referring to FIGS. 12D and 12E, when the substrate assembly 1220 to which the packing member 1260 is applied is mounted in the pen housing 1210 of the electronic pen 1200, the button receiving hole 1212 of the pen housing 1210 may be sealed by the packing member 1260. According to an exemplary embodiment, the support bracket 1250 may be fixed to the substrate support 1227 that supports the substrate 1221, and the packing member 1260 may be attached to the support bracket 1250. According to an exemplary embodiment, the packing protrusion 1262 formed on the packing member 1260 may tightly overlap the inner surface of the pen housing 1210, such that moisture flowing through the button receiving hole 1212 can be prevented by the packing member 1260 from permeating the inside of the pen housing 1210.

According to various exemplary embodiments, the key button 1240 may include a key base 1241 and a key top 1242. According to an exemplary embodiment, the key button 1240 may be fixed in the button receiving hole 1212 of the pen housing 1210 in such a way that the locking pieces 12411 formed at opposite ends of the key base 1241 are locked onto the inner surface of the pen housing 1210. According to an exemplary embodiment, when the key button 1240 is pressed, the locking pieces 12411 may vertically move, and may be induced by the locking piece receiving grooves 1263 formed on the packing member 1260 to smoothly operate.

Figure 13:
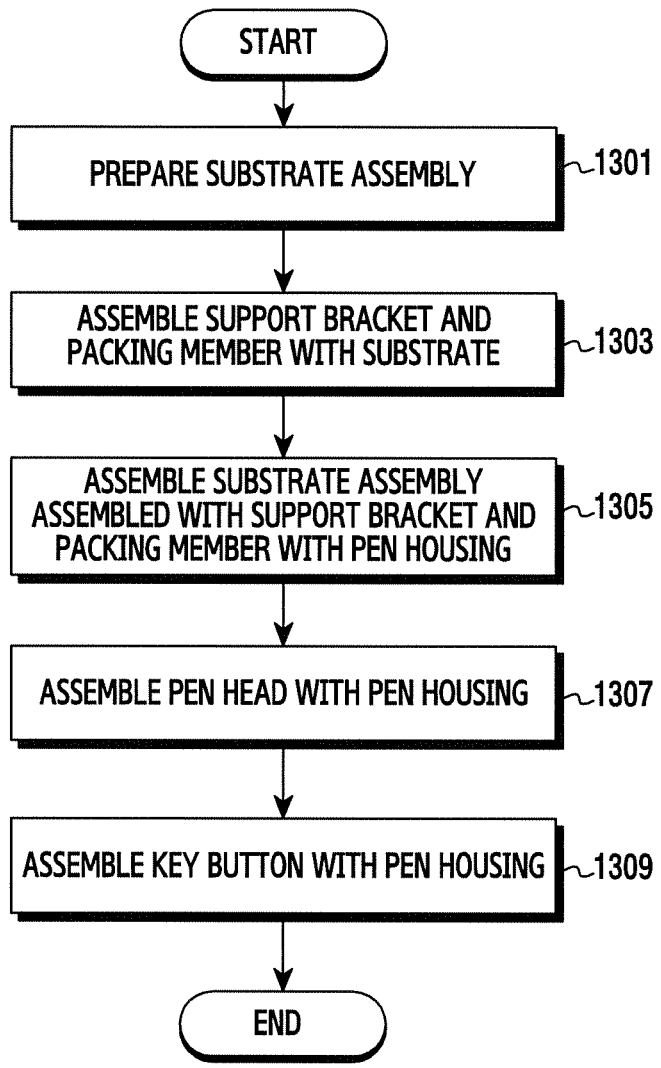
FIG. 13 illustrates a process flowchart showing an assembly order of an electronic pen according to various exemplary embodiments of the present disclosure.

FIG. 13 illustrates a process flowchart showing an assembly order of an electronic pen according to various exemplary embodiments of the present disclosure.

FIG. 13 will be explained with reference to the configuration of FIGS. 12A to 12E described above.

Referring to FIG. 13, in operation 1301, the substrate assembly 1220 may be prepared. According to an exemplary embodiment, the substrate assembly 1220 may include the substrate 1221 on which a plurality of electronic components (electronic function group) are mounted, and the pen pressure sensor 1222, the coil holder 1223, and the pen tip 1225 that are arranged on one side of the substrate 1221 in sequence. The coil holder 1223 may include the coil 1224 wound therearound multiple times, and the pen tip 1225 may be installed to reach the pen pressure sensor 1222 in such a way that the pen tip 1225 penetrates through the coil holder 1223. According to an exemplary embodiment, the substrate assembly 1220 may include the head bracket 1226 that is connected with the pen head 1230 of the electronic pen 1200 on the other side of the substrate 1221.

In operation 1303, the support bracket 1250 and the packing member 1260 may be assembled with the substrate 1221. According to an exemplary embodiment, the support bracket 1250 may be fixed to the substrate support 1227 supporting the substrate 1221, and the packing member 1260 may be attached to the support bracket 1250.

In operation 1305, the substrate assembly 1220 assembled with the support bracket 1250 and the packing member 1260 may be assembled with the pen housing 210. According to an exemplary embodiment, the packing protrusion 1262 formed on the packing member 1260 may tightly overlap the inner surface of the pen housing 1210 such that moisture flowing through the button receiving hole 1212 can be prevented by the packing member 1260 from permeating the inside of the pen housing 1210. According to an exemplary embodiment, when the substrate assembly 1220 is assembled with the pen housing 1210, the first packing ring 12231 may tightly overlap the inner surface of the pen housing 1210 on the pen tip 1225, such that waterproofing/dustproofing can be implemented. According to an exemplary embodiment, the second packing ring 12261 may tightly overlap the inner surface of the pen housing 1210 on the head bracket 1226, such that waterproofing/dustproofing can be implemented.

In operation 1307, the pen head 1230 may be assembled with the pen housing 1210. According to an exemplary embodiment, in a state in which the substrate assembly 1220 is mounted in the pen housing 1210, the pen head 1230 may be fixed to the pen housing 1210 using the head bracket 1226 that is disposed on one side of the substrate assembly 1220.

In operation 1309, the key button 1240 may be assembled with the pen housing 1210. According to an exemplary embodiment, the key button 1240 may be assembled with the pen housing 1210 by means of the assembly structure of FIG. 3D and/or FIG. 4.

Figure 14A:
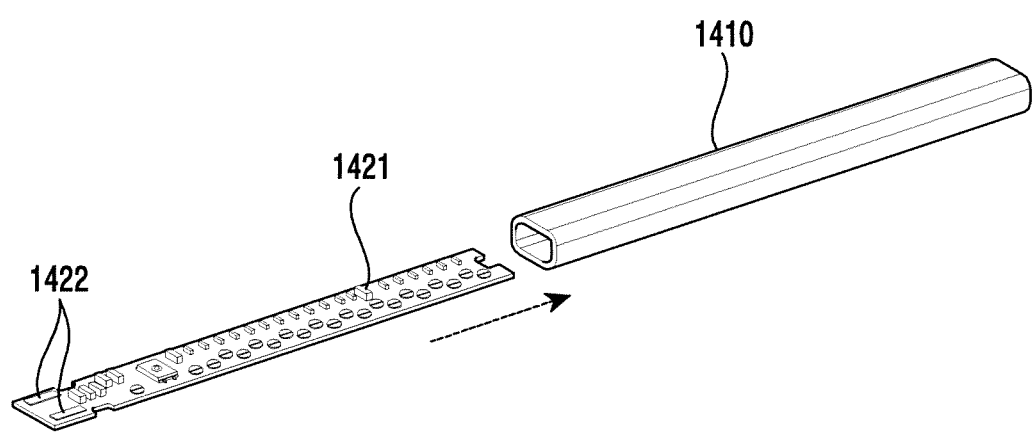
FIGS. 14A and 14B illustrate views showing a waterproof structure using a substrate receiving tube according to various exemplary embodiments of the present disclosure.
Figure 14B:
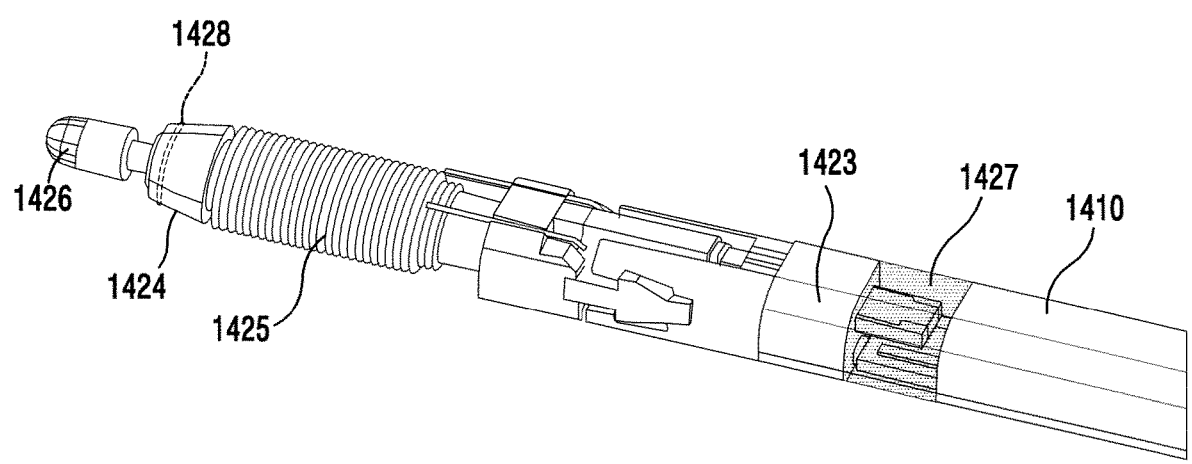

FIGS. 14A and 14B illustrate views showing a waterproof structure using a substrate receiving tube according to various exemplary embodiments of the present disclosure.

The configuration of the substrate assembly may be substantially the same as the configurations of the above-described substrate assemblies. For example, the configurations of a coil holder including a coil, a pen tip that is installed in such a way that it penetrates through the coil holder, and a pen pressure sensor that is connected with the coil holder is the same as the above-described configurations.

Referring to FIGS. 14A and 14B, at least a part of a substrate 1421 may be inserted into a separate substrate receiving tube 1410 having a tubular shape. According to an exemplary embodiment, a terminal part 1422 of the substrate 1421 may be exposed from the substrate receiving tube 1410, and the exposed terminal part 1422 may be electrically connected with a part of the coil 1425 protruding from the pen pressure sensor 1423. According to an exemplary embodiment, the coil 1425 may be fixed to the terminal part 1422 of the substrate 1421 by soldering or the like.

According to various exemplary embodiments, an area that protrudes from the pen pressure sensor 1424 and is electrically connected with the terminal part 1422 of the substrate 1421 may be packed by a packing member 1427. According to an exemplary embodiment, the packing member 1427 may include at least one of rubber, urethane, silicon, or a plastic resin as described above. According to an exemplary embodiment, the packing member 1427 may be formed by applying the substrate assembly to a mold, molding by injecting a liquid or semi-solid packing material into a terminal connection part, and then solidifying by cooling (including naturally cooling). However, this should not be considered as limiting. The packing member 1427 may be formed by applying a liquid or semi-solid material of acrylic, rubber, or fluorine series to the terminal connection part, and then curing in a natural curing method, a UV curing method, or a curing method using heat.

According to various exemplary embodiments, the substrate assembly that is inserted into the substrate receiving tube 1410 and then has an electrical connection part packed by the packing member 1427 may be assembled with the above-described pen housing. According to an exemplary embodiment, in this case, a separate key button may not be provided, and the substrate assembly may tightly overlap the inner surface of the pen housing by applying packing rings to the outer circumferences of the coil holder and the substrate receiving tube.

Figure 15:
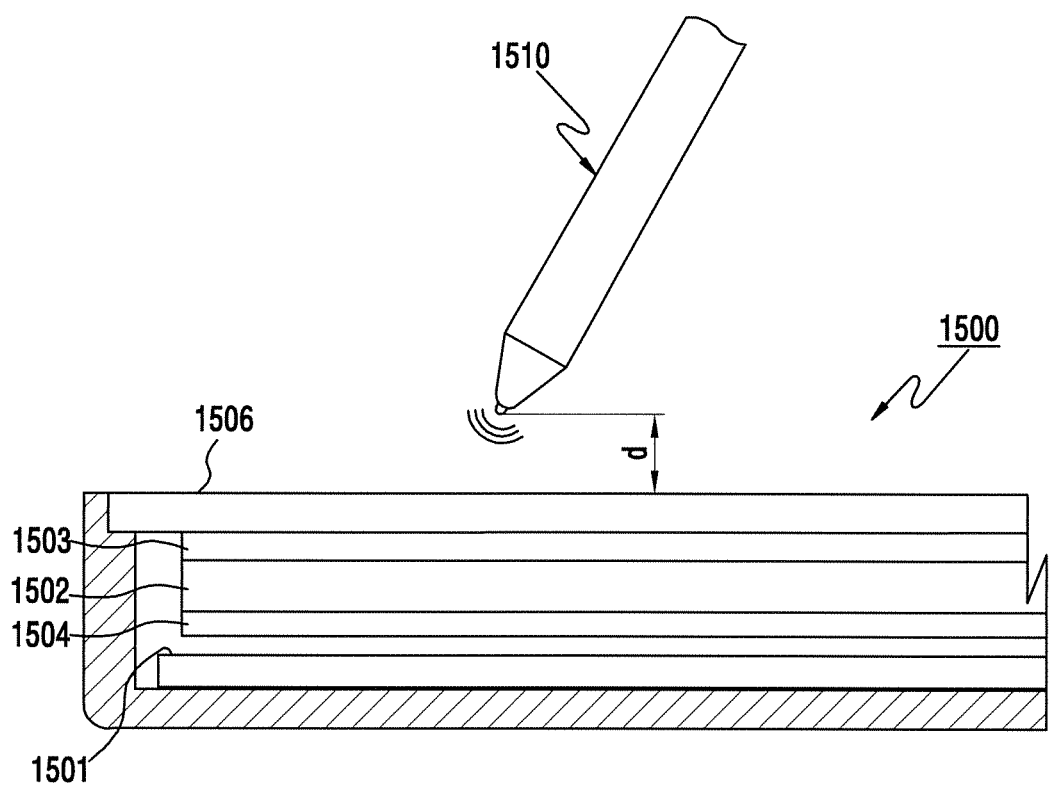
FIG. 15 illustrates a view showing a state in which an electronic pen is applied to an electronic device according to various exemplary embodiments of the present disclosure.

FIG. 15 illustrates a view showing a state in which an electronic pen is applied to an electronic device according to various exemplary embodiments of the present disclosure.

The electronic device 1500 of FIG. 15 may be similar to the electronic device 110 of FIG. 1A, or may be another embodiment of the electronic device. The electronic pen 1510 of FIG. 15 may be similar to the electronic pens 200, 300, 400, 500, 600, 800, 900, 1100, and 1200 described above, or may be another embodiment of the electronic pen.

The electronic pen according to various exemplary embodiments of the present disclosure may implement a waterproof/dustproof function. Accordingly, the electronic pen may be used by interworking with an electronic device having a waterproof/dustproof function. However, this should not be considered as limiting. The electronic pen having the waterproof/dustproof structure according to exemplary embodiments of the present disclosure may be used in various electronic devices that do not have the waterproof/dustproof function, but are capable of detecting the electronic pen.

Referring to FIG. 15, the electronic device 1500 may have a pen sensor (for example, a digitizer) 1504, a display module, which is a display, and a touch panel 1503, which are mounted in an inner area of a housing in sequence, and accordingly, may operate as a complex touch display.

According to various exemplary embodiments, although not shown, the pen sensor 1504 may include a sensor PCB in which a plurality of X-axis coil arrays and a plurality of Y-axis coil arrays are arranged to intersect with each other, a shield plate that is installed on the lower portion of the sensor PCB to block external electromagnetic waves, and a connector that is electrically connected with a PCB of the electronic device. According to an exemplary embodiment, since the pen sensor 1504 includes a lightproof coil, the pen sensor 1504 may be disposed under the touch panel 1503 formed of a transparent material and the display module 1502. However, this should not be considered as limiting. The arrangements of the touch panel 1503, the display module 1502, and the pen sensor 1504 described above are changeable.

According to various exemplary embodiments, when the electronic pen 1510 touches a window 1506 of the electronic device 1500 or approaches within a predetermined distance (d) from the window 1506, the electronic device 1500 may detect the electronic pen 1510. In this case, the electronic device 1500 may detect that the pen sensor 1504 is used and may disable the function of the touch panel 1503 for recognizing a user's finger. However, this should not be considered as limiting. The electronic device 1500 may operate the touch panel 1503 and the pen sensor 1504 simultaneously.

In general, when an electronic device provided with a waterproof function and having a capacitive touch method is in the water, a touch may not be recognized. This is because, in the capacitive touch method, a touch is recognized by flowing a micro current to a touched surface and identifying a change in the current caused by a conductor based on coordinates, and, when the touched surface is wet, coordinates are inputted to many locations and a recognition error occurs due to excessive multi-touch.

According to various exemplary embodiments, when the electronic device 1500 having the waterproof/dustproof structure is operated in the water using the electronic pen 1510 implemented according to exemplary embodiments of the present disclosure, the electronic device 1500 may detect the electronic pen 1510 and perform a corresponding function. According to an exemplary embodiment, the electronic device 1500 may detect the contact or approach of the electronic pen 1510, and may drive a camera application or capture a preview image in the water. Various other functions can be implemented in the water by the electronic pen 1510 implemented in an electromagnetic induction method.

Figure 16:
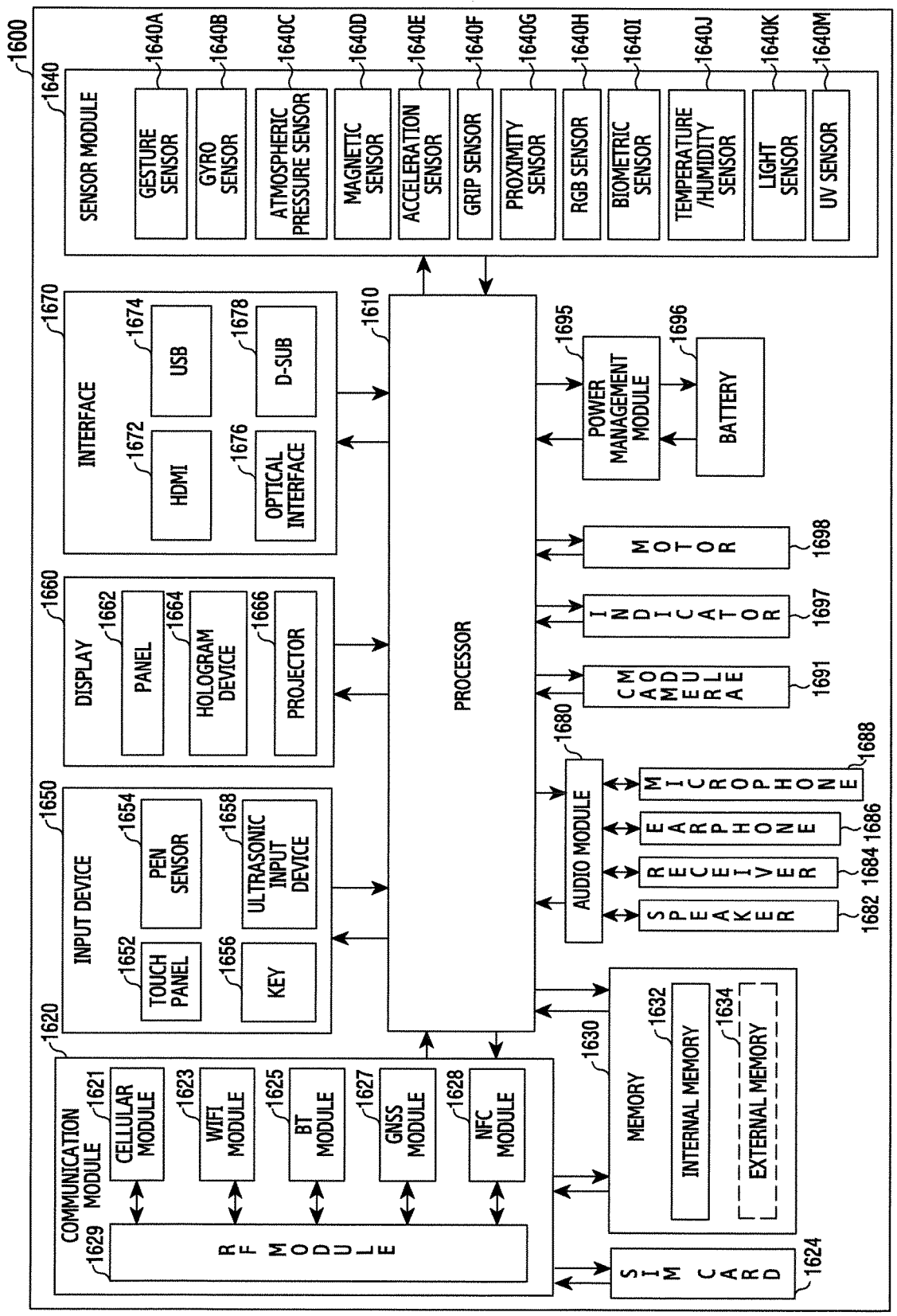
FIG. 16 illustrates a block diagram of an electronic device according to various exemplary embodiments of the present disclosure.

FIG. 16 is a diagram of a configuration of an electronic device, according to an embodiment of the present disclosure.

Referring to FIG. 16, the electronic device 1600 includes at least one processor (AP) 1610, a communication module 1620, a subscriber identification module (SIM) card 1624, a memory 1630, a sensor module 1640, an input device 1650, a display 1660, an interface 1670, an audio module 1680, a camera module 1691, a power management module 1695, a battery 1696, an indicator 1697, and a motor 1698.

The AP 1610 controls a plurality of hardware or software elements connected to the AP 1610 by driving an OS or an application program. The AP 1610 processes a variety of data, including multimedia data, performs arithmetic operations, may be implemented with a system on chip (SoC) and may further include a graphical processing unit (GPU).

The communication module 1620 performs data transmission/reception in communication between the external electronic devices or the server that may be connected with the electronic device 1600 through the network. The communication module 1620 includes a cellular module 1621, a wireless-fidelity (Wi-Fi) module 1623, a BLUETOOTH® (BT) module 1625, a global navigation satellite system (GNSS) or GPS module 1627, a near field communication (NFC) module 1628, and a radio frequency (RF) module 1629.

The cellular module 1621 provides a voice call, a video call, a text service, or an Internet service, such as through a communication network including LTE, LTE-A, CDMA, WCDMA, UMTS, WiBro, and GSM, for example. In addition, the cellular module 1621 identifies and authenticates the electronic device 1600 within the communication network by using the SIM card 1624. The cellular module 1621 may perform at least some of the functions that can be provided by the AP 1610. For example, the cellular module 1621 may perform multimedia control functions.

The cellular module 1621 includes a CP. Further, the cellular module 1621 may be implemented, for example, with an SoC. Although elements, such as the cellular module 1621, the memory 1630, and the power management module 1695 are illustrated as separate elements with respect to the AP 1610 in FIG. 16, the AP 1610 may also be implemented such that at least one part, such as the cellular module 1621 of the aforementioned elements is included in the AP 1610.

The AP 1610 or the cellular module 1621 loads an instruction or data, which is received from each non-volatile memory connected thereto or at least one of different elements, to a volatile memory and processes the instruction or data. In addition, the AP 1610 or the cellular module 1621 stores data, which is received from at least one of different elements or generated by at least one of different elements, into the non-volatile memory.

Each of the Wi-Fi module 1623, the BT module 1625, the GNSS module 1627, and the NFC module 1628 includes a processor for processing data transmitted/received through a corresponding module. Although the cellular module 1621, the Wi-Fi module 1623, the BT module 1625, the GNSS module 1627, and the NFC module 1628 are illustrated in FIG. 16 as separate blocks, at least two of the cellular module 1621, the Wi-Fi module 1623, the BT module 1625, the GNSS module 1627, and the NFC module 1628 may be included in one integrated chip (IC) or IC package. For example, at least some of processors corresponding to the cellular module 1621, the Wi-Fi module 1623, the BT module 1625, the GNSS module 1627, and the NFC module 1628, such as a communication processor corresponding to the cellular module 1621 and a Wi-Fi processor corresponding to the Wi-Fi module 1623, may be implemented with an SoC.

The RF module 1629 transmits/receives data, such as an RF signal, and may include a transceiver, a power amp module (PAM), a frequency filter, or a low noise amplifier (LNA), for example. In addition, the RF module 1629 may further include a component for transmitting/receiving a radio wave on a free space in wireless communication, for example, a conductor, or a conducting wire. The cellular module 1621, the Wi-Fi module 1623, the BT module 1625, the GNSS module 1627, and the NFC module 1628 may share one RF module 1629, and at least one of these modules may transmit/receive an RF signal via a separate RF module.

The SIM card 1624 may be inserted into a slot formed at a specific location of the electronic device 1601. The SIM card 1624 includes unique identification information, such as an integrated circuit card identifier (ICCID) or subscriber information, such as an international mobile subscriber identity (IMSI).

The memory 1630 includes an internal memory 1632 or an external memory 1634.

The internal memory 1632 may include at least one of a volatile memory, such as a dynamic random access memory (DRAM), a static RAM (SRAM), or a synchronous dynamic RAM (SDRAM) or a non-volatile memory, such as a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory. The internal memory 1632 may be a solid state drive (SSD).

The external memory 1634 may include a flash drive, a compact flash (CF), secure digital (SD), micro-SD, mini-SD, extreme digital (xD), and a memory stick, and may be operatively coupled to the electronic device 1600 via various interfaces.

The electronic device 1600 may further include a storage unit (or a storage medium), such as a hard drive.

The sensor module 1640 measures a physical quantity or detects an operation state of the electronic device 1600, and converts the measured or detected information into an electric signal. The sensor module 1640 includes, for example, at least one of a gesture sensor 1640A, a gyro sensor 1640B, a barometric pressure sensor or air sensor 1640C, a magnetic sensor 1640D, an acceleration sensor 1640E, a grip sensor 1640F, a proximity sensor 1640G, a color sensor 1640H, such as a red, green, blue (RGB) sensor, a biometric sensor 1640I, a temperature/humidity sensor 1640J, an illumination/illuminance sensor 1640K and an ultraviolet (UV) sensor 1640M.

Additionally or alternatively, the sensor module 1640 may include, for example, an E-node sensor, an electromyography (EMG) sensor, an electroencephalogram (EEG) sensor, an electrocardiogram (ECG) sensor, and a fingerprint sensor.

The sensor module 1640 may further include a control circuit for controlling at least one or more sensors included therein.

The input device 1650 includes a touch panel 1652, a (digital) pen sensor 1654, a key 1656, or an ultrasonic input unit 1658.

The touch panel 1652 recognizes a touch input by using at least one of an electrostatic type configuration, a pressure-sensitive type configuration, and an ultrasonic type configuration. The touch panel 1652 may further include a control circuit. In the instance where the touch panel is of the electrostatic type, both physical contact recognition and proximity recognition are possible. The touch penal 1652 may further include a tactile layer, which provides the user with a tactile reaction.

The (digital) pen sensor 1654 may include a recognition sheet that can be a part of the touch panel or can be separated from the touch panel. The key 1656 may include a physical button, an optical key, or a keypad. The ultrasonic input device 1658 may detect ultrasonic waves generated by an input tool through a microphone 1688, and may confirm data corresponding to the detected ultrasonic waves.

The (digital) pen sensor 1654 may be implemented using the same or similar method of receiving a touch input of a user or using an additional sheet for recognition.

The key 1656 may be a physical button, an optical key, a keypad, or a touch key.

The ultrasonic input unit 1658 detects a reflected sound wave through a microphone 1688 and is capable of radio recognition. For example, an ultrasonic signal, which may be generated by using a pen, may be reflected off an object and detected by the microphone 1688.

The electronic device 1600 may use the communication module 1620 to receive a user input from an external device, such as a computer or a server connected thereto.

The display 1660 includes a panel 1662, a hologram 1664, or a projector 1666.

The panel 1662 may be an LCD or an AM-OLED, for example. The panel 1662 may be implemented in a flexible, transparent, or wearable manner, and may be constructed as one module with the touch panel 1652.

The hologram device 1664 uses an interference of light and displays a stereoscopic image in the air.

The projector 1666 displays an image by projecting a light beam onto a screen. The screen may be located inside or outside the electronic device 1601.

The display 1660 may further include a control circuit for controlling the panel 1662, the hologram device 1664, or the projector 1666.

The interface 1670 may include an HDMI 1672, a USB 1674, an optical communication interface 1676, or a d-sub-miniature (D-sub) 1678. The interface 1670 may be included, for example, in the communication interface 160 of FIG. 1, and may include a mobile high-definition link (MHL), SD/multi-media card (MMC) or infrared data association (IrDA).

The audio module 1680 bilaterally converts a sound and an electric signal. At least some elements of the audio module 1680 may be included in the input/output interface 150 of FIG. 1. The audio module 1680 converts sound information which is input or output through a speaker 1682, a receiver 1684, an earphone 1686, or the microphone 1688.

The speaker 1682 may output a signal of an audible frequency band and a signal of an ultrasonic frequency band. Reflected waves of an ultrasonic signal emitted from the speaker 1682 and a signal of an external audible frequency band may be received.

The camera module 1691 is a device for image and video capturing, and may include one or more image sensors, such as a front sensor or a rear sensor, a lens, an image signal processor (ISP), or a flash, such as an LED or a xenon lamp. In certain instances, it may prove advantageous to include two or more camera modules.

The power management module 1695 manages power of the electronic device 1600. The power management module 1695 may include a power management integrated circuit (PMIC), a charger IC, or a battery gauge.

The PMIC may be placed inside an IC or an SoC semiconductor and may use a wired charging and/or a wireless charging method. The charger IC can charge a battery and can prevent an over-voltage or over-current flow.

The wireless charging may be classified, for example, into a magnetic resonance type, a magnetic induction type, and an electromagnetic type. An additional circuit for the wireless charging, such as a coil loop, a resonant circuit, or a rectifier may be added.

The battery gauge may measure a residual quantity of the battery 1696 and a voltage, current, and temperature during charging. The battery 1696 stores or generates electricity and supplies power to the electronic device 1600 by using the stored or generated electricity. The battery 1696 may include a rechargeable battery or a solar battery.

The indicator 1697 indicates a specific state, such as a booting state, a message, or a charging state of the electronic device 1600 or a part thereof, such as the AP 1610.

The motor 1698 converts an electric signal into a mechanical vibration.

The electronic device 1600 includes a processing unit, such as a GPU, for supporting mobile TV that processes media data according to a protocol of, for example, digital multimedia broadcasting (DMB), digital video broadcasting (DVB), or media flow.

Each of the aforementioned elements of the electronic device 1600 may consist of one or more components, and names thereof may vary depending on a type of the electronic device 1600. The electronic device 1600 may include at least one of the aforementioned elements. Some of the elements may be omitted, or additional other elements may be further included. In addition, some of the elements of the electronic device 1600 may be combined and constructed as one entity, so as to equally perform functions of corresponding elements before combination.

At least some parts of the electronic device 1600, such as modules or functions thereof, or operations, may be implemented with an instruction stored in a non-transitory computer-readable storage media for example. The instruction may be executed by the processor 1610, to perform a function corresponding to the instruction. The non-transitory computer-readable storage media may be the memory 1630. At least some parts of the programming module may be executed by the processor 1610. At least some parts of the programming module may include modules, programs, routines, and a set of instructions for performing one or more functions.

According to various exemplary embodiments, the electronic device 1600 may be configured to have a waterproof/dustproof structure. According to an exemplary embodiment, when the electronic device is used in the water, the processor 1610 may detect that the electronic device 1600 is in the water through various sensors. According to an exemplary embodiment, the processor 1610 may detect that the electronic device 1600 is in the water by recognizing multiple touches more than necessary due to moisture through the touch panel. According to an exemplary embodiment, the processor 1610 may detect that the electronic device 1600 is in the water by calculating a reflection coefficient of a reflected wave in the water through an ultrasonic sensor.

According to various exemplary embodiments, when the processor 1610 detects that the electronic device 1600 is in the water, the processor 1610 may inactivate (for example, disregard) the function of the touch panel 1652 and control to receive only an input function of the electronic pen using the pen sensor 1654.

Figure 17:
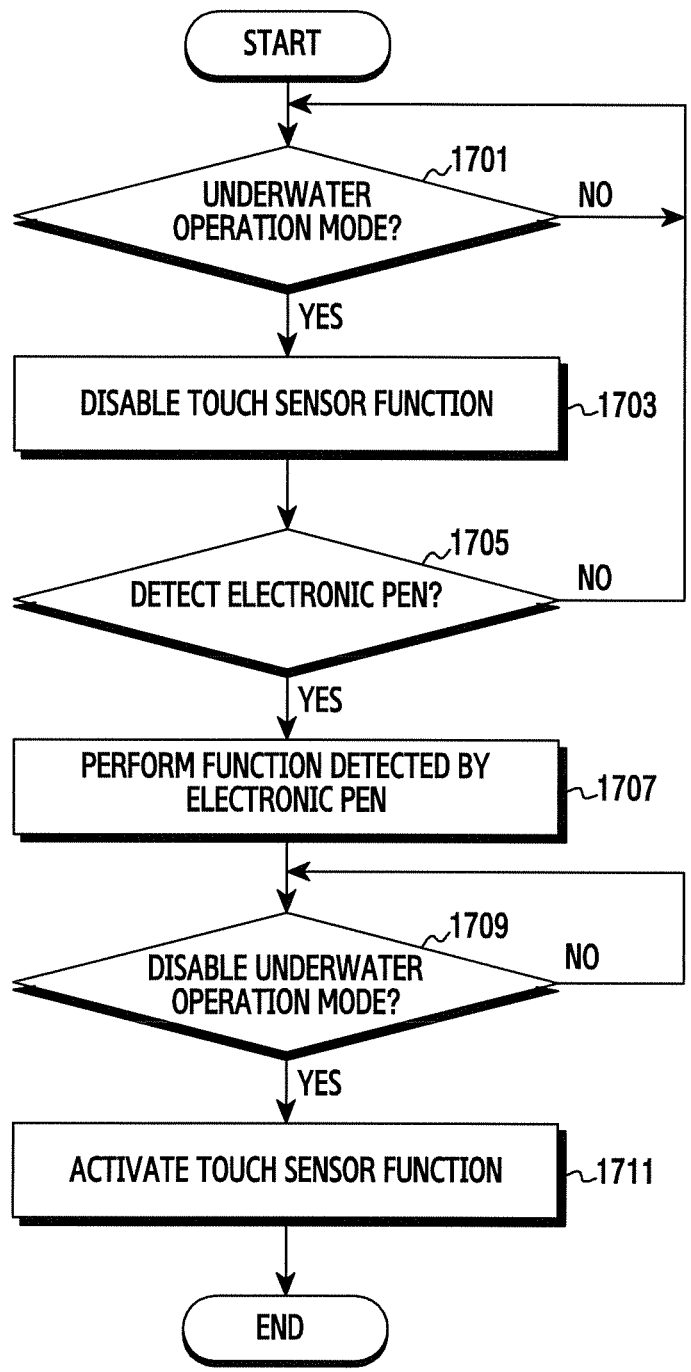
FIG. 17 illustrates a flowchart for performing a function of an electronic device in the water using an electronic pen having a waterproof/dustproof structure according to various exemplary embodiments of the present disclosure.

FIG. 17 illustrates a flowchart for performing a function of an electronic device in the water using an electronic pen having a waterproof/dustproof structure according to various exemplary embodiments of the present disclosure. The method of FIG. 17 may be performed by the electronic device 1500 of FIG. 15 and/or the electronic device 1600 of FIG. 16.

Referring to FIG. 17, in operation 1701, the electronic device 1500 (for example, the processor 1610 of the electronic device) may detect whether the electronic device 1500 is in an underwater operation mode. According to an exemplary embodiment, the electronic device 1500 may detect that the electronic device 1500 is in the water by detecting an excessive touch input in the water using the capacitive touch panel 1503. According to an exemplary embodiment, the electronic device 1500 may detect that the electronic device 500 is in the water by calculating a reflection coefficient of a reflected wave in the water through an ultrasonic sensor.

In operation 1703, when it is determined that the electronic device 1500 is in the water, the electronic device 1500 may perform an operation of disabling a touch sensor function of the touch panel 1503. According to an exemplary embodiment, the electronic device 1500 may inactivate the touch panel 1503 or may switch to a state in which a touch input is disregarded in an activated state.

In operation 1705, the electronic device 1500 may detect an input of the electronic pen 1510. According to an exemplary embodiment, since the electronic pen 1510 operates by interworking with the pen sensor 1504 disposed in the electronic device in the electromagnetic induction method, the electronic pen 1510 may perform an input operation even when the electronic device 1500 is in the water. According to an exemplary embodiment, the electronic device 1500 may detect the electronic pen contacting the window 1506 or approaching within a predetermined distance from the window 1506.

In operation 1707, when the electronic device 1500 detects the input of the electronic pen 1510, the electronic device 1500 may perform a corresponding function. According to an exemplary embodiment, the electronic pen 1510 may perform the same function as the function performed by an input that is detected by the existing capacitive touch panel 1503. For example, when a subject is captured in the water using the electronic device 1500, the electronic device 1500 may perform various functions such as entering a camera mode or capturing a preview image according to an input of the electronic pen 1510.

In operation 1709, the electronic device 1500 may detect whether the underwater operation mode is disabled or not, and, when the underwater operation mode is disabled, the electronic device 1500 may enter operation 1711 to activate the touch panel 1503 and thus drive the touch sensor function. According to an exemplary embodiment, when the touch sensor function of the touch panel 1503 is activated, the electronic device may control to perform a complex touch display function with the pen sensor 1504.

Various exemplary embodiments of the present disclosure provide the electronic pen having the waterproof/dustproof structure, such that user convenience can be improved, and the electronic pen interworks with the electronic device having the waterproof structure and performs a corresponding function in the water.

The various exemplary embodiments disclosed in the present specification and drawings are merely specific embodiments to easily explain the technical features and assist easy understanding, and are not intended to limit the scope of the present disclosure. Therefore, the scope of the present disclosure is defined not by the detailed description of the disclosure but by the appended claims, and all differences within the scope should be construed as being included in the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic pen, the electronic pen comprising:
    a pen housing;
    a substrate assembly mounted inside the pen housing;
    a packing member surrounding at least part of the substrate assembly; and
    at least one packing ring enclosing at least one end of the substrate assembly, the at least one packing ring mounted inside the pen housing.

2. The electronic pen of claim 1, wherein the at least one packing ring comprises:
    a first packing ring enclosing an end of the substrate assembly; and
    a second packing ring enclosing another end of the substrate assembly.

3. The electronic pen of claim 2, wherein the packing member surrounds an entirety of the substrate assembly and extends to the first packing ring and the second packing ring, and
    wherein the first packing ring and the second packing ring protrudes to an inner surface of the pen housing from the packing member.

4. The electronic pen of claim 1, wherein:
    the packing member is molded to enclose an entirety of the substrate assembly by injecting a liquid packing material using a mold, and
    the molded packing member is solidified.

5. The electronic pen of claim 4, wherein the packing member is assembled with the pen housing in a manner that an outer surface of the packing member overlaps an entirety of an inner surface of the pen housing.

6. The electronic pen of claim 1, wherein:
    the packing member comprises at least one of rubber, urethane, silicon, or a plastic resin, and
    the packing member is formed by applying an entirety of the substrate assembly to a mold, molding by injecting a liquid or semi-solid packing material, and then solidifying.

7. The electronic pen of claim 1, wherein a gap between the substrate assembly and the pen housing is sealed by the at least one packing ring.

8. The electronic pen of claim 1, wherein the at least one packing ring is arranged to overhang an inner surface of the pen housing by at least one end of the pen housing when the substrate assembly is mounted inside the pen housing.

9. The electronic pen of claim 1, wherein the at least one packing ring are formed of at least one of rubber, urethane, or silicon.

10. The electronic pen of claim 1, wherein:
    the packing member is formed by applying a liquid or semi-solid packing material to a surface of a substrate area of the substrate assembly on which an electronic component is mounted, and
    the formed packing member is cured.

11. The electronic pen of claim 10, wherein the packing material comprises at least one of liquid or semi-solid materials of acrylic, rubber, or fluorine series.

12. The electronic pen of claim 1, comprising:
    a key button installed in a button receiving hole of the pen housing; and
    a switch mounted on a substrate of the substrate assembly corresponding to the key button and configured to operate according to a pressing operation of the key button,
    wherein the packing member is disposed to avoid the switch, and includes a packing protrusion formed in a manner that the packing protrusion is configured to enclose an avoided area and overhang an inner surface of the pen housing at a button receiving hole.

13. The electronic pen of claim 12, wherein the key button is connected with an outer surface of the pen housing by a tight-fitting operation after the substrate assembly, comprising the packing member, is mounted in the pen housing.

14. The electronic pen of claim 1, wherein the substrate assembly comprises:
    a substrate;
    a pen pressure sensor connected to one side of the substrate;
    a pen tip holder connected to the pen pressure sensor;
    a pen tip disposed in a manner that the pen tip is configured to penetrate through the pen tip holder, and includes at least a part thereof exposed to the outside of the pen housing when the substrate assembly is mounted in the pen housing; and
    a head bracket connected to another side of the substrate to be connected with a pen head.

15. The electronic pen of claim 14, wherein:
the packing member is molded to enclose from the pen tip holder of the substrate assembly to at least a part of the head bracket by injecting a liquid packing material using a mold, and
the molded packing member is solidified.

16. The electronic pen of claim 14, wherein:
the at least one packing ring includes a first packing ring enclosing an outer circumference of the pen tip holder and configured to overhang an inner surface of one end of the pen housing during assembly and a second packing ring enclosing an outer circumference of the head bracket and configured to overhang an inner surface of another end of the pen housing during assembly,
the packing member is molded to enclose a substrate area of the substrate assembly by injecting a liquid packing material using a mold,
the molded packing member is solidified, and
the packing member is extended to the first packing ring and the second packing ring.

17. An electronic pen comprising:
a pen housing;
a substrate assembly mounted in the pen housing;
a pen head installed on one end of the pen housing;
a key button installed in a button receiving hole formed on an appropriate location of an outer surface of the pen housing; and
a packing member disposed on at least a part of the substrate assembly,
wherein the substrate assembly comprises:
a substrate comprising a switch configured to operate by an operation of the key button;
a pen pressure sensor connected to one side of the substrate;
a pen tip holder connected to the pen pressure sensor;
a pen tip disposed in a manner that the pen tip is configured to penetrate through the pen tip holder, and includes at least a part thereof exposed to the outside of the pen housing; and
a head bracket connected to another side of the substrate to be connected with the pen head,
wherein, when the substrate assembly is assembled with the pen housing, at least a part of the packing member is configured to overhang an inner surface of the pen housing,
wherein the packing member is molded to enclose a substrate area of the substrate assembly by injecting a liquid packing material using a mold, and
wherein the packing member comprises:
a first packing ring disposed on an outer circumference of the pen tip holder and configured to overhang an inner surface of one end of the pen housing during assembly; and
a second packing ring disposed on an outer circumference of the head bracket and configured to overhang an inner surface of another end of the pen housing during assembly.

18. The electronic pen of claim 17, wherein:
the packing member is molded to enclose an entirety of the substrate assembly by injecting a liquid packing material using a mold,
the molded packing member is solidified, and
the packing member extends to the first packing ring and the second packing ring.

19. The electronic pen of claim 17, comprising:
a support bracket disposed to enclose the switch on the substrate; and
wherein the packing member comprises a packing protrusion protruding in a manner that the packing protrusion is configured to enclose an edge of the button receiving hole of the pen housing and overhanging an inner surface of the pen housing during assembly, and configured to transmit a pressing force of the key button on a top surface of the support bracket to the switch through the support bracket.

20. An electronic device configured to detect an electronic pen, the electronic device comprises:
a pen mounting hole in which the electronic pen is detachably mounted, and
wherein the electronic pen comprises:
a pen housing;
a substrate assembly mounted inside the pen housing;
a packing member surrounding at least part of the substrate assembly;
a first packing ring enclosing an end portion of the substrate assembly in the pen housing; and
a second packing ring enclosing another end portion of the substrate assembly in the pen housing.

\* \* \* \* \*